(12) United States Patent
He

(10) Patent No.: US 12,168,274 B2
(45) Date of Patent: Dec. 17, 2024

(54) END EFFECTOR AND LIGHT BAR ASSEMBLING DEVICE

(71) Applicants: BOE OPTICAL SCIENCE AND TECHNOLOGY CO., LTD., Jiangsu (CN); BOE TECHNOLOGY GROUP CO., LTD., Beijing (CN)

(72) Inventor: Qiuwei He, Beijing (CN)

(73) Assignees: BOE Optical Science and Technology Co., Ltd., Jiangsu (CN); BOE Technology Group Co., Ltd., Beijing (CN)

( * ) Notice: Subject to any disclaimer, the term of this patent is extended or adjusted under 35 U.S.C. 154(b) by 900 days.

(21) Appl. No.: 17/263,921

(22) PCT Filed: Jun. 29, 2020

(86) PCT No.: PCT/CN2020/098704
§ 371 (c)(1),
(2) Date: Jan. 28, 2021

(87) PCT Pub. No.: WO2021/051927
PCT Pub. Date: Mar. 25, 2021

(65) Prior Publication Data
US 2021/0379708 A1     Dec. 9, 2021

(30) Foreign Application Priority Data
Sep. 20, 2019     (CN) .......................... 201910891758.1

(51) Int. Cl.
*B23P 19/00*     (2006.01)
*B23P 19/04*     (2006.01)
(Continued)

(52) U.S. Cl.
CPC ........... *B23P 19/04* (2013.01); *B25J 15/0616* (2013.01); *B25J 19/023* (2013.01)

(58) Field of Classification Search
CPC .... B25J 19/023; B25J 15/0061; B25J 15/009; B25J 15/0616; B23P 19/04
See application file for complete search history.

(56) References Cited

U.S. PATENT DOCUMENTS 9,550,453 B2 * 1/2017 Gergets ................... F21S 43/31
2012/0261870 A1 * 10/2012 Hsieh ..................... H05K 3/007
29/464

(Continued)

FOREIGN PATENT DOCUMENTS

CN     205008840 U  *  2/2016
CN     106276285 A     1/2017
(Continued)

*Primary Examiner* — Paul D Kim
(74) *Attorney, Agent, or Firm* — The Webb Law Firm

(57) ABSTRACT

An end effector and a light bar assembling device having the end effector are provided. The light bar assembling device is configured to assemble a light bar with a backplane, and includes: an adjusting platform configured to carry the light bar to be assembled and adjust a position of the light bar to be assembled on the adjusting platform; and a robot assembling mechanism configured to obtain a light bar after being adjusted in position from the adjusting platform, and assemble the light bar with the backplane, wherein the robot assembling mechanism includes a mechanical arm and an end effector at a free end of the mechanical arm, and the end effector includes: a first connecting seat, a first frame, a first pick-and-place mechanism including at least two first suction cup groups, and a first positioning mechanism including at least two first positioning pins.

17 Claims, 8 Drawing Sheets

(51) Int. Cl.
     *B25J 15/06*      (2006.01)
     *B25J 19/02*      (2006.01)
     *H05K 13/04*    (2006.01)

(56) References Cited

U.S. PATENT DOCUMENTS

| | | |
|---|---|---|
| 2016/0320030 A1 | 11/2016 | Mei et al. |
| 2018/0159150 A1 | 6/2018 | Kim |

FOREIGN PATENT DOCUMENTS

| | | | |
|---|---|---|---|
| CN | 106984547 A | 7/2017 | |
| CN | 107617869 A | 1/2018 | |
| CN | 108214530 A | 6/2018 | |
| CN | 108465602 A | 8/2018 | |
| CN | 108942142 A | 12/2018 | |
| CN | 109014811 A | 12/2018 | |
| CN | 109015735 A | 12/2018 | |
| CN | 208246854 U | 12/2018 | |
| CN | 109334019 A | 2/2019 | |
| CN | 109866204 A | 6/2019 | |
| CN | 209356654 U | 9/2019 | |
| KR | 1020180064864 A | 6/2018 | |
| KR | 1020190089533 A | 7/2019 | |
| WO | WO-2014166188 A1 * | 10/2014 | .............. B23P 19/00 |

* cited by examiner

END EFFECTOR AND LIGHT BAR ASSEMBLING DEVICE

CROSS-REFERENCE TO RELATED APPLICATIONS

The present application is a U.S. National Stage Application under 35 U.S.C. § 371 of International Patent Application No. PCT/CN2020/098704, filed on Jun. 29, 2020, which is based on and claims priority to China Patent Application No. 201910891758.1 filed on Sep. 20, 2019, the disclosure of both which are incorporated by reference herein in their entirety.

TECHNICAL FIELD

The present disclosure relates to an end effector and a light bar assembling device.

BACKGROUND

For a LCD television, the luminous effect of the backlight plays an important role in the overall picture quality of the television. In some existing technologies, the backlight source is provided by light bars of a light emitting diode (referred to as LED for short). The backlight source of a LCD television includes a plurality of light bars, and with a gradually enlarged size of the television, there is also an increasing number of light bars included. The light bars are accurately fixed on the backplane by screws or glue. With the enlarged size of the television and the enhanced requirements for the picture quality, higher requirements are raised for feeding and assembling the light bars. In some related technologies, the feeding and assembling are accomplished by labor.

SUMMARY

In one aspect of the present disclosure, a light bar assembling device for assembling a light bar with a backplane is provided. The device includes: an adjusting platform configured to carry the light bar to be assembled and adjust a position of the light bar to be assembled on the adjusting platform; and a robot assembling mechanism configured to obtain the light bar after being adjusted in position from the adjusting platform, and assemble the light bar with the backplane, wherein the robot assembling mechanism includes a mechanical arm and an end effector arranged at a free end of the mechanical arm, the end effector including: a first connecting seat connected with the free end of the mechanical arm; a first frame connected to the first connecting seat; at least one first pick-and-place mechanism arranged on the first frame and configured to obtain the light bar after being adjusted from the adjusting platform and place the light bar on the backplane, wherein each first pick-and-place mechanism includes at least two first suction cup groups, each of which includes at least one first suction cup, and first suction cups in the at least two first suction cup groups are located in a same plane; and at least one first positioning mechanism arranged on the first frame and configured to be insertedly mated with a positioning hole in the light bar after being adjusted, wherein each of the first positioning mechanisms includes at least two first positioning pins located in a same plane as the first suction cups in the at least two first suction cup groups.

In one aspect of the present disclosure, an end effector is provided. The end effector includes: a first connecting seat; a first frame connected to the first connecting seat; at least one first pick-and-place mechanism arranged on the first frame and configured to obtain and release a light bar, wherein each first pick-and-place mechanism includes: at least two first suction cup groups; and at least one first positioning mechanism arranged on the first frame, and configured to be insertedly mated with a positioning hole in the light bar; wherein each first suction cup group includes at least one first suction cup, and first suction cups in the at least two first suction cup groups are located in a same plane, and each first positioning mechanisms includes: at least two first positioning pins located in a same plane as the first suction cups in the at least two first suction cup groups.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiment merely illustrates the inventive concept but does not limit the technical solution of the present application.

The use of the terms "first", "second" and similar words in the present disclosure are used to distinguish between different parts. The terms "up", "down", "left", "right", or the like are used only to represent a relative positional relationship, and the relative positional relationship may be changed correspondingly if the absolute position of the described object changes.

In some related technologies, the feeding and assembling of LED light bars are completed by labor. The inventor has found through research that, the operation mode of feeding and assembling by labor is present with the problems of low efficiency and high labor requirements. Moreover, with an enlarged size of the product using a backlight source, the maximum operation range of an operator's arm cannot cover a backplane surface of the entire product, which results in that it is easily to cause problems such as fatigue of an operator and reduced assembling accuracy under a high-strength operation environment.

In view of this, the embodiments of the present disclosure provide an end effector, and a light bar assembling device and assembling method, which can improve the efficiency and accuracy of the light bar assembly.

Figure 1:
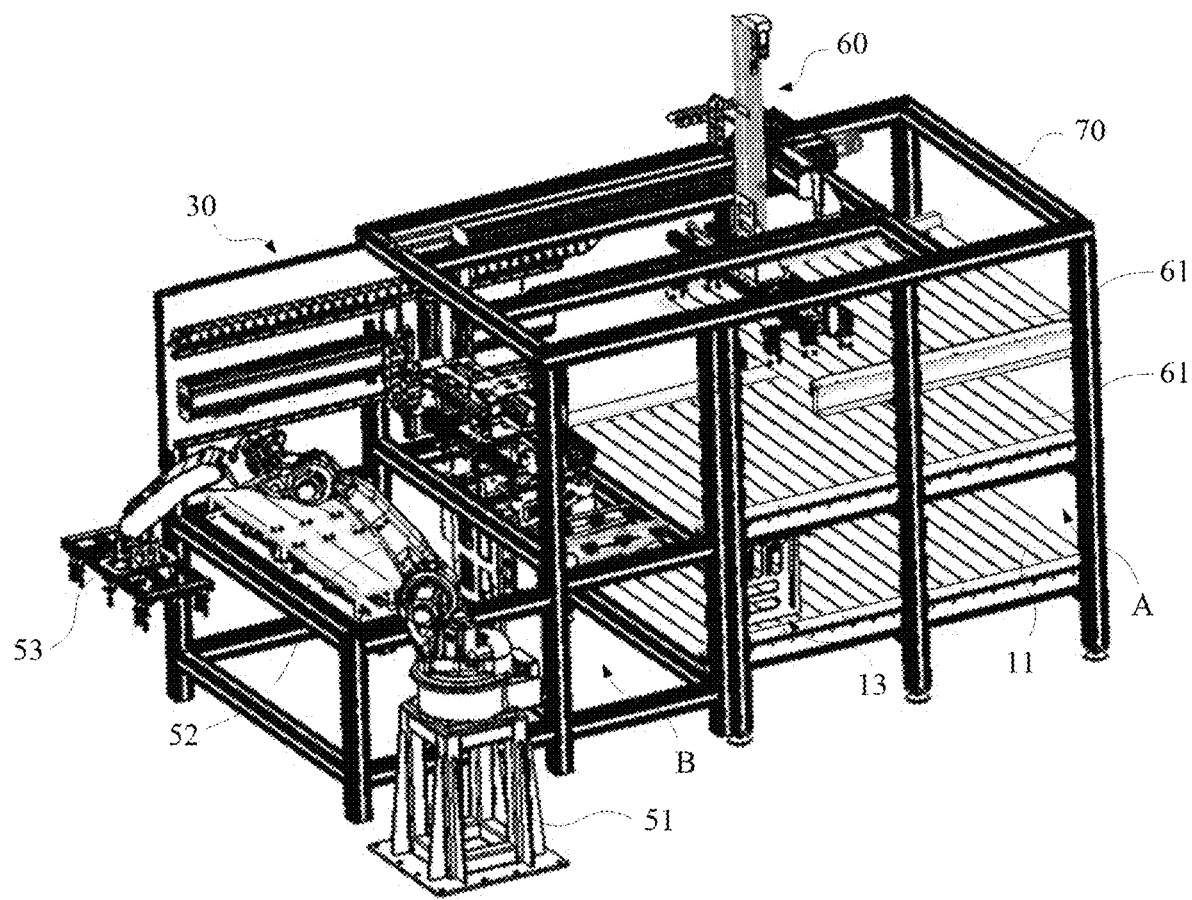
FIGS. 1 and 2 are respectively three-dimensional schematic views of an embodiment of the light bar assembling device according to the present disclosure in different perspective views.
Figure 2:
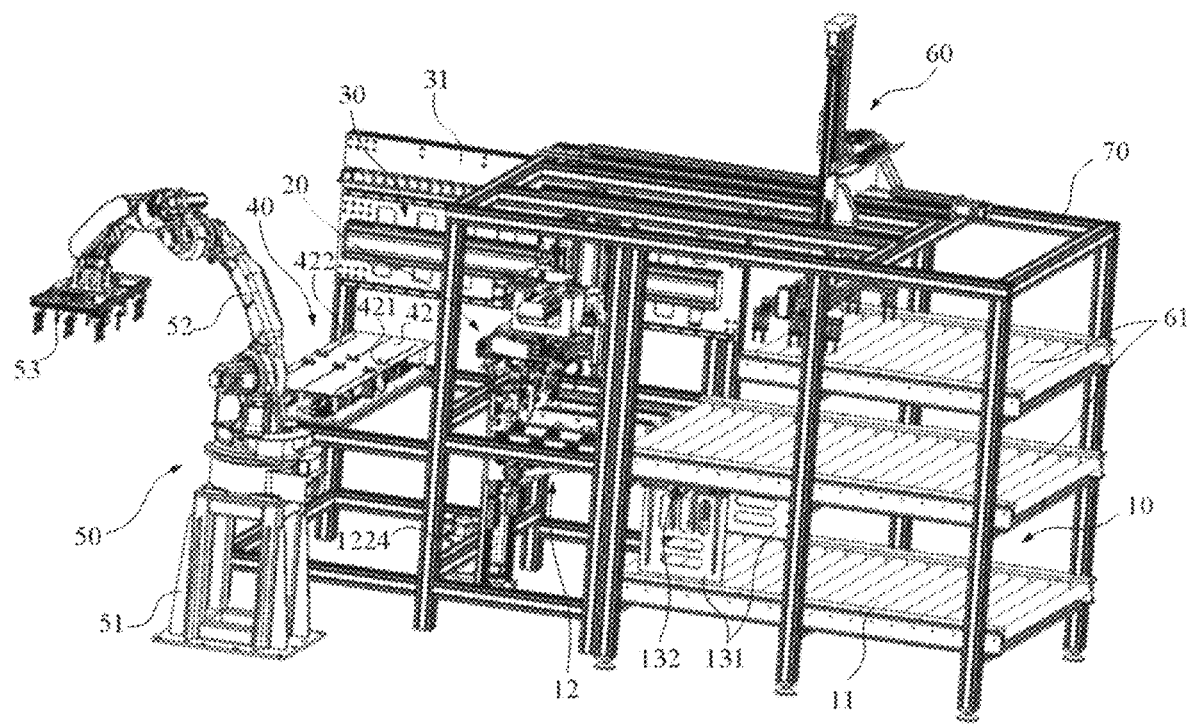

FIGS. 1 and 2 are respectively three-dimensional schematic views of an embodiment of the light bar assembling device according to the present disclosure in different perspective views.

Referring to FIGS. 1 and 2, in some embodiments, the light bar assembling device includes: a receiving mechanism 20, a transferring mechanism 30, an adjusting platform 40 and a robot assembling mechanism 50. The receiving mechanism 20 is configured to obtain a light bar to be assembled. In some embodiments, the light bar has a length far outweigh a width thereof, and may have a cross-sectional shape such as polygonal, circular, elliptical or semicircular, and may have a shape such as a linear shape, a polyline shape or wavy shape as a whole. For example, the light bar includes an LED light bar, which has a linear shape as a whole and a rectangular cross-sectional shape.

The adjusting platform 40 may be configured to adjust a position of the light bar to be assembled that has been received. Specifically, the adjusting platform 40 may adjust a position of the light bar to be assembled in two mutually orthogonal directions parallel to the horizontal plane, so as to facilitate the robot assembling mechanism 50 to perform obtaining and assembling. Taking the LED light bar as an example, the adjusting platform may adjust positions of a plurality of light bars to be assembled to be in a state parallel to each other and where their ends or centers are aligned in a width direction.

The transferring mechanism 30 is connected with the receiving mechanism 20, such that the receiving mechanism 20 is driven to move the light bar to be assembled to the adjusting platform 40 after the receiving mechanism 20 obtains the light bar to be assembled. The robot assembling mechanism 50 may obtain the light bar after being adjusted from the adjusting platform 40 in position and assemble it with the backplane. The backplane may be located on one side of the robot assembling mechanism 50 away from the adjusting platform. For the LED light bar, the robot assembling mechanism 50 assembles it to the backplane for the backlight source.

Referring to FIGS. 1 and 2, in some embodiments, the light bar assembling device of the present disclosure may further include a feeding mechanism 10. The feeding mechanism 10 may transfer the light bar to be assembled that is inputted from the feeding position A (i.e., an initial position after the light bar is conveyed to the light bar assembling device) to the receiving position B of the receiving mechanism 20 (i.e., a starting position of a transferring stroke of the transferring mechanism 30, also a return position the transferring mechanism 30 after completing the transfer). The light bar to be assembled may be placed within a pallet, and the pallet is placed in the feeding mechanism 10 by labor or automatically docked with the feeding mechanism 10 through an automatic guided vehicle (referred to as AGV for short). The feeding mechanism 10 may realize simultaneous feeding of one or more layers.

In FIGS. 1 and 2, the light bar assembling device of the present disclosure may further include a removing mechanism 60, which is configured to remove at least one of an empty pallet located at the receiving position B and emptied, and a defective product determined in the light bars to be assembled at the receiving position B out from the light bar assembling device.

In FIGS. 1 and 2, the receiving mechanism 20, the adjusting platform 40, the transferring mechanism 30, the feeding mechanism 10, and the removing mechanism 60 may be carried by the support frame 70 so as to reduce the occupied space and reduce the wiring difficulty. In other embodiments, one or more of the receiving mechanism, the adjusting platform, the transferring mechanism, the feeding mechanism, and the removing mechanism may be respectively carried by a plurality of independent support frames.

Referring to FIG. 1, in some embodiments, the robot assembling mechanism 50 includes a mechanical arm support 51, a mechanical arm 52 and an end effector 53. The mechanical arm support 51 may be fixedly mounted on the ground or a platform, and located on one side of the support frame 70 adjacent to the adjusting platform 40. The mechanical arm 52 is arranged on the mechanical arm support 51, which can meet the requirements of high efficiency, high precision, and complex movement. The mechanical arm 52 may use the mechanical arm structure and control function of an industrial robot in the prior art, on which will not be focused here. The end effector 53 is arranged at the free end of the mechanical arm 52, and may be driven by the mechanical arm 52 to pick up the light bar after being adjusted in position on the adjusting platform 40. In this way, the end effector 53 is driven by the mechanical arm 52 to accurately assemble the light bar with the backplane, and the empty end effector 53 may be driven in turn by the mechanical arm 52 to return to the adjusting platform 40 for picking up a next group of light bars.

Figure 3:
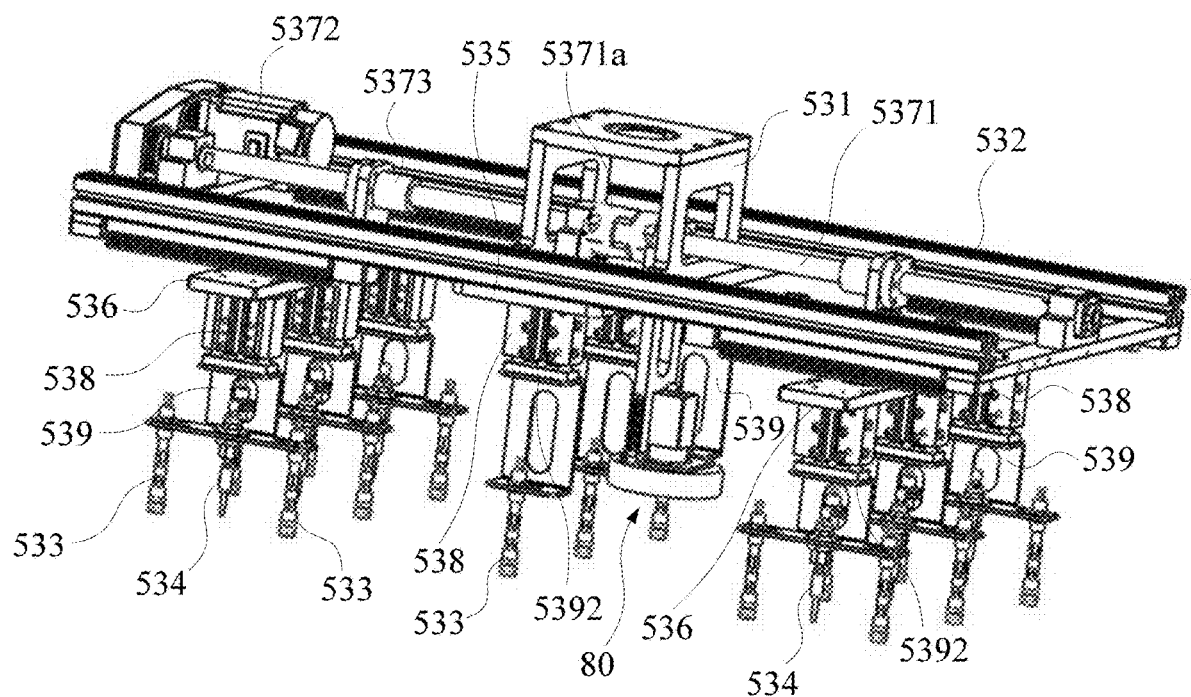
FIG. 3 is a three-dimensional schematic structural view of the end effector in the robot assembling mechanism in an embodiment of the light bar assembling device according to the present disclosure.
Figure 4:
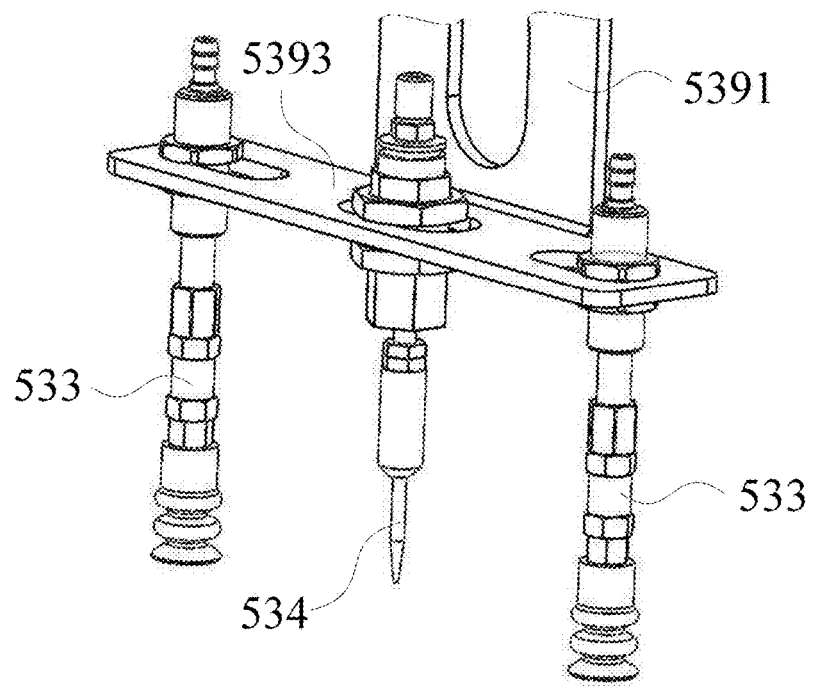
FIG. 4 is a schematic view of a mounting structure connecting the first suction cup group, the first positioning pin and the first connection rack in FIG. 3.
Figure 5:
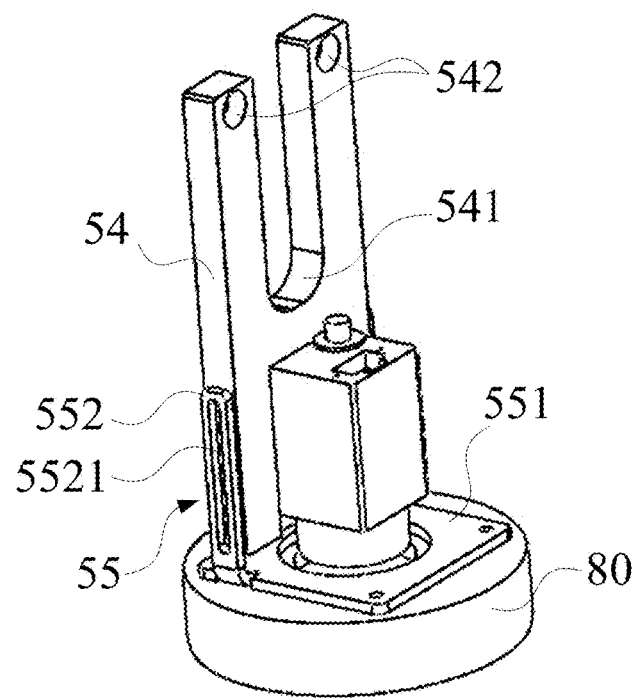
FIG. 5 is a schematic view of a mounting structure of the image sensor, the mounting bracket and the adjusting bracket in FIG. 3.

FIG. 3 is a three-dimensional schematic structural view of the end effector in the robot assembling mechanism in an embodiment of the light bar assembling device according to the present disclosure. FIG. 4 is a schematic view of a mounting structure connecting the first suction cup group, the first positioning pin and the first connection rack in FIG. 3. FIG. 5 is a schematic view of a mounting structure of the image sensor, the mounting bracket and the adjusting bracket in FIG. 3.

Referring to FIG. 3, in some embodiments, the end effector 53 includes: a first connecting seat 531, a first frame 532, at least one first positioning mechanism, and at least one first pick-and-place mechanism. The first connecting seat 531 is connected to the free end of the mechanical arm 52, and the first frame 532 is connected to the first connecting seat 531, so that when the mechanical arm 52 moves, the first connecting seat 531 and the first frame 532 may move along the same. In FIG. 3, the first frame 532 includes two first beams parallel to each other and a second beam located between the two first beams and respectively connected to the ends of the two first beams. The first connecting seat 531 includes two side plates and a top plate. The two side plates are parallel to each other and fixed on the first beam or the second beam of the first frame 532. The top plate is fixedly connected to the top of the two side plates. The free end of the mechanical arm 52 may be fixedly connected to the top plate, or may be fixedly connected to the two side plates.

At least one first positioning mechanism which is arranged on the first frame, may be configured to inserted mated with the positioning hole in the light bar after being adjusted in position. The positioning hole in the light bar may be a preformed hole for passing the connector, for example, a preformed hole for a lock screw provided in the light bar. At least one first pick-and-place mechanism is arranged on the first frame, and configured to obtain and release the light bar after being adjusted in position. In FIG. 3, the end effector 53 includes three first positioning mechanisms and three first pick-and-place mechanisms. The three first positioning mechanisms which are in one-to-one correspondence with the three first pick-and-place mechanisms, may obtain and position three light bars respectively.

Referring to FIG. 4, in some embodiments, each first pick-and-place mechanism includes at least two first suction cup groups. Each first suction cup group includes at least one first suction cup 533. The first suction cup 533 may realize the vacuum suction action and the release action after the vacuum is released under the switching of the solenoid valve. Each first positioning mechanism includes: at least two first positioning pins 534. The first positioning pin 534 may have a pyramid or conical top to facilitate access to the positioning hole in the light bar. In some embodiments, the first suction cups 533 in the at least two first suction cup groups are located in the same plane as the at least two first positioning pins 534. The same plane here means that the central axis of each first suction cup 533 is coplanar with the central axis of each first positioning pin 534.

With at least two first suction cup groups sucking the light bar at the at least two positions in a length direction, it is possible to allow the first pick-and-place mechanism to obtain and transfer the light bar more stably and reliably. The light bar may be provided with at least two positioning holes in a length direction, and the first positioning mechanism may respectively enter the at least two positioning holes through the at least two positioning pins, so as to ensure an accurate position where the light bar is obtained.

In order to enable the end effector 53 to match the positions of the three light bars on the adjusting platform 40 so as to obtain three light bars at the same time, referring to FIGS. 3 and 4, in some embodiments, at least two first suction cup groups includes three first suction cup groups. The end effector 53 further includes: a first fixing seat 535, two first sliding seats 536, a first driving mechanism, three groups of first cylinders 538, and three groups of first connection racks 539.

The first fixing seat 535 is fixedly connected to the first frame 532. The two first sliding seats 536 are connected to the first frame 532. The first driving mechanism is connected to the two first sliding seats 536 and configured to drive the two first sliding seats 536 to move relative to the first frame 532. By driving the first sliding seat 536 to move, it is possible to change a suction position of the first suction cup group and a positioning position of the first positioning pin, so as to meet the requirements of picking up light bars with different specifications.

The three groups of first cylinders 538 are respectively connected to the first fixing seat 535 and the two first sliding seats 536, and each group of first cylinders 538 includes at least one first cylinder 538. Three groups of first connection racks 539 are respectively connected to the power output ends of the three groups of first cylinders 538, and respectively connected to the three first suction cup groups, wherein each group of first connection racks 539 includes at least one first connection rack 539.

In this way, the end effector 53 may drive the two first sliding seats 536 through the first driving mechanism, so that the first cylinder 538 directly connected to the two first sliding seats 536, and the connection rack 539 and the first suction cup group that are indirectly connected the two first sliding seats 536 can adjust the suction position along a length direction of the light bar. The first cylinder 538 may drive the first connection rack 539 close to or away from the first frame 532. When the first frame 532 is integrally horizontal, the first cylinder 538 may realize a lifting and lowering action of the first suction cup group connected to the first connection rack 539 in a vertical position.

In FIG. 3, the first fixing seat 535 is optionally located between the two first sliding seats 536. In this way, when the first suction cup group corresponding to the two first sliding seats 536 sucks the positions on both sides of the light bar that are close to the ends, a middle part of the light bar may be sucked through the first suction cup group corresponding to the first fixing seat 535, thereby avoiding excessive sagging of the middle part of the light bar due to gravity, and further affecting the assembling accuracy. The first suction cup group corresponding to the first sliding seat 536 may include two first suction cups 533 to increase the suction force, thereby improving the stability of suction. The first suction cup group corresponding to the first fixing seat 535 may include a single first suction cup 533, which may avoid excessive sagging of the middle of the light bar, thereby simplifying the related pipeline of the first suction cup.

In other embodiments, for short or highly rigid light bars, the end effector 53 may omit the first fixing seat 535 and its corresponding first cylinder 538, first connection rack 539, first suction cup group and the like.

Referring to FIGS. 3 and 4, the at least two first positioning pins include two first positioning pins 534, which are respectively connected to the first connection racks 539 corresponding to the two first sliding seats 536. In this way, the first cylinder 538 may perform a synchronous lifting drive on the first suction cup group and the first positioning pin 534 through the first connection rack 539. The first positioning pin 534 which may be arranged on the first connection rack 539 corresponding to the first sliding seat 536, may be located in the middle position between the two first suction cups 533 connected to the first connection rack 539, so that after the first positioning pin 534 is inserted into the positioning hole of the light bar from a sky side of the light bar, the light bar is sucked tightly by two first suction cups 533 on both sides of the positioning hole. At this time, the first positioning pin 534 may form a stable and balanced support effect over the light bar with the first suction cups 533 on both sides of the first positioning pin 534.

Referring to FIG. 3, each first connection rack 539 may include a C-shaped bending plate. The C-shaped bending plate may include a connecting portion 5391, and a first bent portion 5392 and a second bent portion 5393 respectively connected to both ends of the connecting portion 5391. The first bent portion 5392 and the second bent portion 5393 are parallel to each other, and perpendicular to the connecting portion 5391. The first bent portion 5392 is fixedly connected to the power output end of the first cylinder 538.

In FIG. 4, the second bent portion 5393 is connected to the first suction cup group. The second bent portion 5393 may also be connected to the first positioning pin 534. A through hole for connecting the first suction cup 533 and the first positioning pin 534 may be provided in the second bent portion 5393. The first suction cup 533 and the first positioning pin 534 may be fixed by a nut after passing through the through hole. In order to facilitate adjusting the positions of the first suction cup 533 and the first positioning pin 534 relative to the first connection rack 539, the through hole may be provided to be an obround hole.

Referring to FIG. 3, in some embodiments, the first driving mechanism includes: a first lead screw 5371, a first power mechanism 5372, and two first nuts 5373. In FIG. 3, the first lead screw 5371 is arranged on the first frame 532 and rotatable around an axis of the first lead screw 5371. The axis of the first lead screw 5371 is parallel to the length direction of the light bar after being adjusted in position. The first power mechanism 5372 is arranged on the first frame 532 and connected to the first lead screw 5371 for outputting power to the first lead screw 5371. The first power mechanism 5372 may be a servo motor or a stepping motor.

The two first nuts 5373 are respectively fixedly connected to the two first sliding seats 536 and threadedly engaged with the first lead screw 5371. With the rotation of the first lead screw 5371, the two first nuts 5373 may move relative to the first frame 532 along an extending direction of the first lead screw 5371, so as to drive the two first sliding seats 536 to move relative to the first frame 532.

In FIG. 3, the first lead screw 5371 may include a coupling 5371*a* and two lead screw sections respectively connected to both ends of the coupling 5371*a*. The threads of the two lead screw sections are opposite, and threadedly engaged with the two first nuts respectively. Correspondingly, the threads of the two first nuts are also opposite, so as to maintain consistence with the threads of the lead screw sections to be mated. In this way, when the first lead screw 5371 is driven to rotate by the first power mechanism 5372, the two first nuts may be driven to move close to each other or away from each other. Compared with forming two opposite threaded sections on the entire screw, the manner of connecting two lead screw sections with threads in opposite directions through the coupling 5371*a* is more convenient in manufacturing and is lower in cost.

Referring to FIG. 3, in some embodiments, the robot assembling mechanism further includes an image sensor 80. The image sensor 80 may be a Charge Coupled Device (referred to as CCD for short) image sensor, or a Complementary Metal Oxide Semiconductor (referred to as CMOS for short) sensor.

The image sensor 80 may be arranged on the first frame 532 and may move together with the end effector 53 under the drive of the mechanical arm 52. The image sensor 80 may capture images of the light bar to be assembled on the adjusting platform 40. The images captured by the image sensor 80 may be sent to the controller for image analysis to determine an actual position of the positioning hole of the light bar to be assembled, so that the controller may send a control instruction to the first driving mechanism, which allows that the at least two first positioning pins 534 are driven by the first driving mechanism to align the positioning hole of the light bar to be assembled. In this way, it is possible improve the accuracy of picking up the light bar on the adjusting platform 40 by the end effector 53, thereby ensuring a continuous assembling process, and improving the assembling efficiency. In addition, the images captured by the image sensor 80 are recognized so that an adhesion position of the first suction cup 533 on the end effector 53 adheres to a blank area of the light bar away from other structures on the light bar (such as the LED lamp bead on the light bar).

The backplane may be conveyed on the assembly line. When the backplane is conveyed to the assembling position, the photoelectric switch induces that the backplane is in place, which triggers the cylinder blocking mechanism in the assembly line to rise and block the backplane. The adjusting cylinder in the assembly line may push a surrounding contour of the backplane to realize the initial positioning of the backplane. The image sensor 80 may also perform image capturing on the backplane to achieve the precise positioning of the backplane. In addition, the images captured by the image sensor are analyzed so that it is possible to determine a precise position in the backplane that needs to be assembled, which allows that the mechanical arm can accurately adjust an assembling position of the light bar after being adjusted in position that is picked up by the end effector relative to the assembling position of the backplane, so as to accurately and rapidly complete the assembling process of the light bar on the backplane.

During the process of assembling the light bar to the backplane, the pick-up position of the light bar is adjusted by the adjusting platform, so that the robot assembling mechanism accurately obtains the light bar after being adjusted in position from the adjusting platform and assemble it to the backplane. In this process, the position adjustment of the light bar is completed by the adjusting platform. The robot assembling mechanism may achieve a larger operation range. The end effector using the suction cup group and the positioning pin may accurately and stably pick up the light bar on the adjusting platform and release the light bar at a position for assembling with the backplane.

Referring to FIGS. 3 and 5, in some embodiments, the robot assembling mechanism 50 further includes: a mounting bracket 54 and an adjusting bracket 55. The mounting bracket 54 is fixedly connected to the first fixing seat 535. The adjusting bracket 55 is connected to the mounting bracket 54 and the image sensor 80, and adjustable in position relative to the mounting bracket 54. The mounting bracket 54 is fixedly connected to the first fixing seat 535 so that it is possible to ensure that the mounting bracket 54 moves along with the movement of the end effector 53 without being affected by other parts of the end effector, for example affected by movements of the first sliding seat 536 and a power output end of the first cylinder 538.

In FIG. 5, the mounting bracket 54 may include a U-shaped structure 541, and two through holes 542 may be respectively provided on both sides of the U-shaped structure 541, so that a screw member is fixedly connected to the first fixing seat 535 by passing through the two through holes 542. The hollow part of the U-shaped structure 541 may lessen the weight of the mounting bracket 54 and may avoid interference between the mounting bracket 54 and a member such as the first cylinder 538 connected to the first fixing seat 535.

Referring to FIG. 5, in some embodiments, the adjusting bracket 55 may include: a mounting plate 551 and an adjusting plate 552. The mounting plate 551 has a through hole that may accommodate part of the outer contour of the image sensor 80. The adjusting plate 552 is fixedly connected or integrally formed with the mounting plate 551, and may be adjusted in position relative to the mounting bracket 54.

In FIG. 5, the mounting bracket 54 is provided with a threaded hole, the adjusting plate 552 includes an adjusting groove 5521 having a length direction perpendicular to the mounting plate 551, and the threaded hole can be aligned with the adjusting groove 5521 at a plurality of positions in a length direction, so that a screw member passes through the adjusting groove 5521 and is threadedly connected to the threaded hole. In this way, when it is necessary to adjust an image collection distance of the image sensor 80 relative to the light bar or the backplane, for example, to adjust a focal length of the image sensor, it is possible to loosen the screw member and move the adjusting plate 552 toward the first frame 532, and when it reaches a proper position, the adjusting plate 552 is fixed on the mounting bracket 54 by the screw member.

Figure 6:
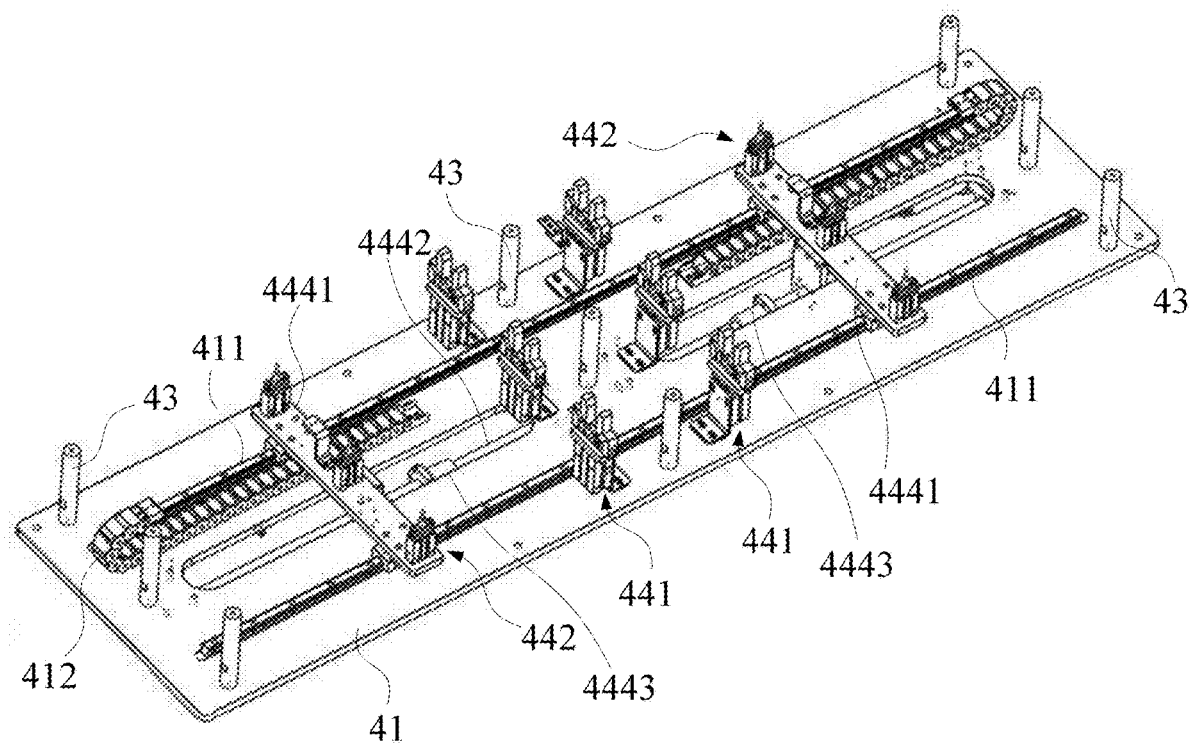
FIG. 6 is a three-dimensional schematic structural view of the adjusting platform hiding a support plate in an embodiment of the light bar assembling device of the present disclosure.
Figure 7:
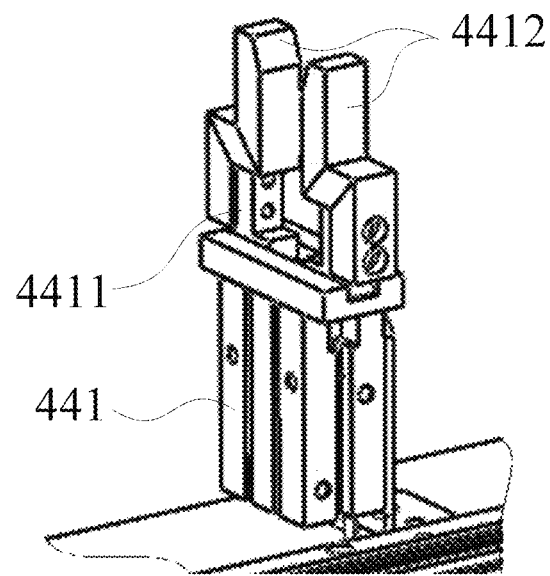
FIG. 7 is a schematic view of a mounting structure of the second cylinder and the clamping claw in FIG. 6.
Figure 8:
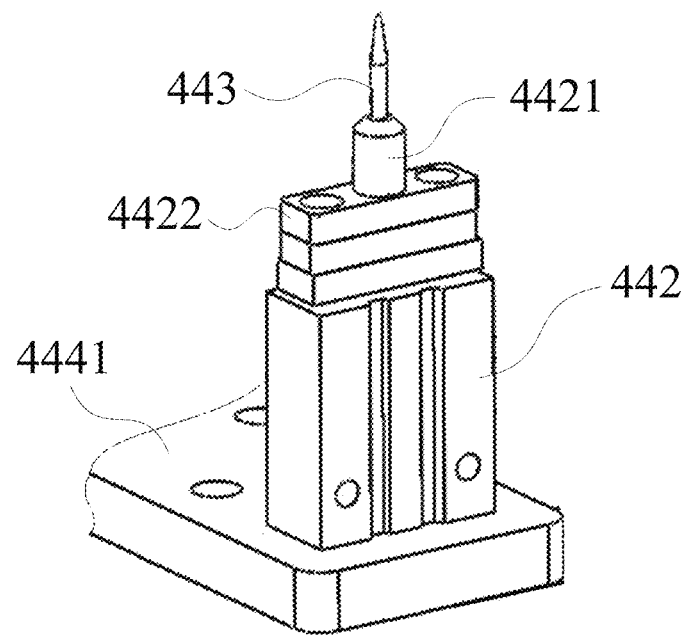
FIG. 8 is a schematic view of a mounting structure of the second positioning pin and the third cylinder in FIG. 6.

FIG. 6 is a three-dimensional schematic structural view of the adjusting platform hiding a support plate in an embodiment of the light bar assembling device of the present disclosure. FIG. 7 is a schematic view of a mounting structure of the second cylinder and the clamping claw in FIG. 6. FIG. 8 is a schematic view of amounting structure of the second positioning pin and the third cylinder in FIG. 6.

Referring to FIGS. 2 and 6, in some embodiments, the adjusting platform 40 includes: a base 41, a support plate 42, a support pin 43, and at least one centering adjustment mechanism. The base 41 may be fixedly or detachably arranged on the support frame 70 and located on one side of the receiving position B away from the feeding mechanism 10. The base 41 may be arranged adjacent to the robot assembling mechanism 50, so that the robot assembling mechanism 50 may obtain and assemble the light bar within an accessible range. The support plate 42 is located on a sky side of the base 41 and configured to support the light bar to be assembled.

The support pin 43 is located between the support plate 42 and the base 41 for supporting the support plate 42 and forming a receiving space between the support plate 42 and the base 41. In FIG. 6, a plurality of support pins 43 may be provided between the support plate 42 and the base 41, wherein the plurality of support pins 43 may be respectively arranged on sides and corners of the base 41. For example, three groups of support pins 43 are provided on a ground side of a position where the support plate 42 supports three light bars to be assembled, wherein each group of support pins 43 includes more than two support pins 43. A plurality of support pins 43 are provided at the center of a length direction of the support plate 42 along a width direction of the support plate 42, so as to prevent sagging of the middle of the support plate 42.

At least one centering adjustment mechanism is arranged on the base 41. The number of centering adjustment mechanisms may be determined according to the number of light bars to be assembled that are adjusted in position at the same time. For example, when the transferring mechanism moves two light bars to be assembled at a time, two or more than three centering adjustment mechanism s may be provided on the base 41. The idle centering adjustment mechanism may serve as a backup mechanism for the centering adjustment mechanism in use.

At least a portion of the centering adjustment mechanism is located in the receiving space, and configured to centrally position the light bar to be assembled on the support plate 42. After the light bar to be assembled is moved to the upper surface of the support plate 42, the centering adjustment mechanism may adjust a position of the light bar to be assembled in at least one direction, so that the robot assembling mechanism 50 may quickly and accurately obtain the light bar.

Referring to FIGS. 2, 6 and 7, in some embodiments, the support plate 42 is provided with at least one through hole group. Each through hole group includes at least two through holes 421 penetrating along a vertical direction of the support plate 42. Each of the centering adjustment mechanisms includes at least two second cylinders 441. Each second cylinder 441 has two power output ends 4411 that may move close to each other or away from each other, and the two power output ends 4411 are respectively fixedly connected to the two clamping claws 4412.

In FIG. 2, the two clamping claws 4412 are exposed from the upper surface of the support plate 42 via the through hole 421. The two clamping claws 4412 may be driven by the second cylinder 441 to perform a centering positioning on the light bar located between the two clamping claws 4412 in a width direction of the light bar.

In addition to the centering positioning in a width direction, in some embodiments, the centering adjustment mechanism may also realize the centering positioning in a length direction of the light bar. Referring to FIGS. 2, 6 and 8, in some embodiments, the support plate 42 is provided with at least one groove group. Each groove group includes two grooves 422 located on the same straight line and penetrating along a vertical direction of the support plate 42.

In FIG. 8, each centering adjustment mechanism may specifically include: two second positioning pins 443, two third cylinders 442, and a second driving mechanism. The two second positioning pins 443 can be respectively exposed or retracted from the upper surface of the support plate 42 via the two grooves of the support plate 42 along a vertical direction of the support plate 42. The second positioning pin 443 may have a pyramid or conical top to facilitate access to the positioning hole in the light bar.

The two third cylinders 442 are connected to the two second positioning pins 443 and configured to drive the two second positioning pins 443 to move along a vertical direction of the support plate 42. The third cylinder 442 may be entirely located on a ground side of the support plate 42. In this way, when the two second positioning pins 443 are respectively driven by the two third cylinders 442 to retract below the upper surface of the support plate 42, the two second positioning pins 443 may not interfere with the process of placing the light bar on the support plate 42 by the transferring mechanism.

The second driving mechanism which is connected to the two third cylinders 442, may drive the two third cylinders 442 to move close to each other or away from each other along a straight line where the two grooves are located. In this way, after the two third cylinders 442 respectively drive the two second positioning pins 443 to project above the upper surface of the support plate 42, the two second positioning pins 443 may move close to each other through the second driving mechanism, so that centering positioning in a length direction is realized on the light bar located between the two second positioning pins 443. After the centering positioning is completed, the second driving mechanism may drive the two second positioning pins 443 to move away from each other to return to a preparation position before the centering positioning.

Referring to FIG. 6, in some embodiments, at least one centering adjustment mechanism includes a plurality of centering adjustment mechanisms, wherein the plurality of centering adjustment mechanisms share the same second driving mechanism. This helps simplify the structure and reduce the difficulty of control. In some other embodiments, a plurality of centering adjustment mechanisms may also use independent second driving mechanisms respectively.

In FIG. 6, the base 41 may be provided with a first guide rail 411. The extension direction of the first guide rail 411 is parallel to the length direction of the light bar on which centering positioning has been completed in a width direction. The second driving mechanism may include: two second sliding seats 4441, a second lead screw 4442, a second power mechanism, and two second nuts 4443. The two second sliding seats 4441 are slidably connected to the first guide rail 411, and respectively connected to the two third cylinders 442 of each centering adjustment mechanism.

The second lead screw 4442 which is arranged on the base 41, may rotate around an axis of the second lead screw 4442. The two second nuts 4443 which are respectively fixedly connected to the two second sliding seats 4441, and threadedly engaged with the second lead screw 4442, may move relative to the first guide rail 411 along an extending direction of the axis of the second lead screw 4442 as the second lead screw 4442 rotates, so as to drive the two second sliding seats 4441 to move relative to the support plate 42.

The second lead screw 4442 may refer to the structure of the first lead screw 5371, that is, the second lead screw 4442 includes a coupling and two lead screw sections respectively connected to both ends of the coupling and having opposite threads. The two lead screw sections may be threadedly engaged with the two second nuts 4443 respectively. In this way, when the second lead screw 4442 rotates, the two second nuts 4443 may be driven to move close to each other or away from each other.

The second power mechanism is arranged on the base 41, and connected to the second lead screw 4442 for outputting power to the second lead screw 4442. The second power mechanism may be a servo motor or a stepping motor and the like. In addition, a drag chain 412 for protecting the circuit may also be provided on the base 41.

Referring to FIG. 8, in some embodiments, the cylinder of the third cylinder 442 is fixedly connected with a guide sleeve 4421 having a through inner cavity, and the second positioning pin 443 passes through the through inner cavity of the guide sleeve 4421, and is fixedly connected to the power output end of the third cylinder 442. The guide sleeve 4421 may be fixed on the cylinder block of the third cylinder 442 through a pressure plate 4422 with a through hole and a screw member. When the power output end of the third cylinder 442 projects in a direction away from the cylinder, the second positioning pin 443 may be driven to project upward along the through inner cavity of the guide sleeve 4421.

Figure 9:
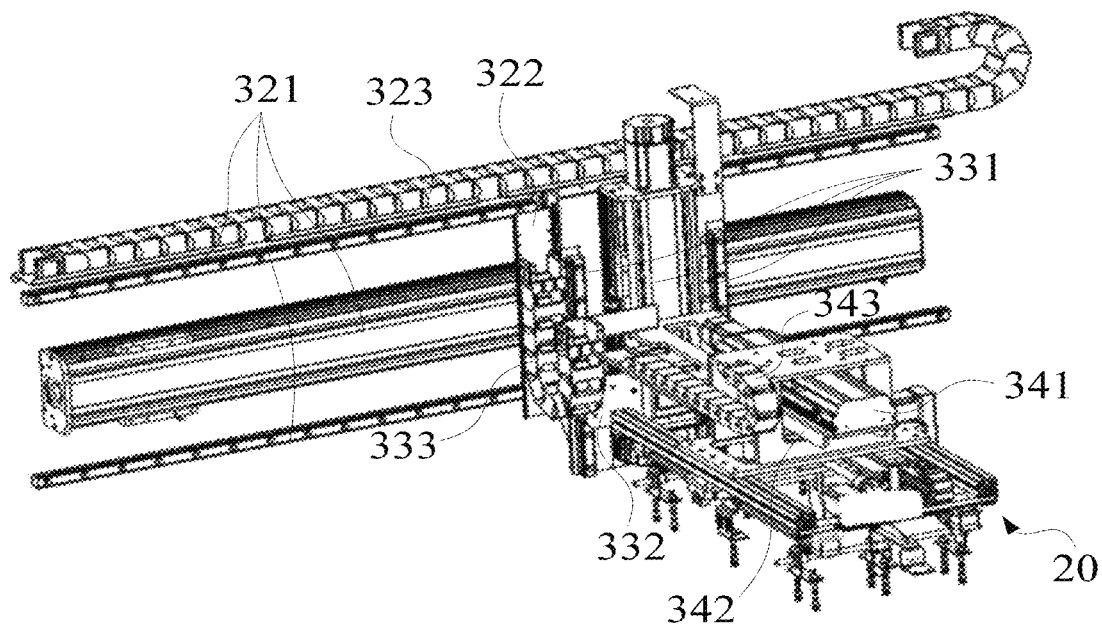
FIG. 9 is a schematic view of a mounting structure of the transferring mechanism and the receiving mechanism in an embodiment of the light bar assembling device according to the present disclosure.
Figure 10:
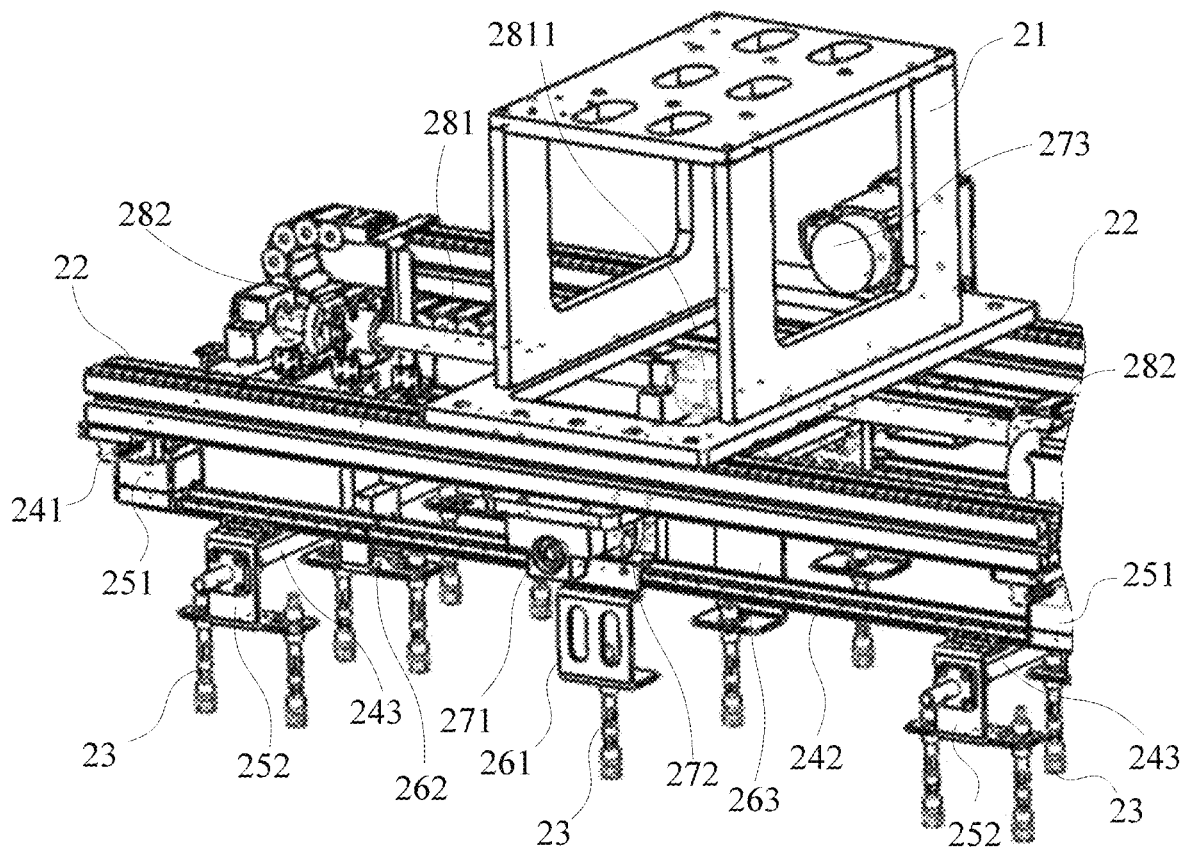
FIG. 10 is a three-dimensional schematic structural view of the receiving mechanism in an embodiment of the light bar assembling device according to the present disclosure.

FIG. 9 is a schematic view of a mounting structure of the transferring mechanism and the receiving mechanism in an embodiment of the light bar assembling device according to the present disclosure. FIG. 10 is a three-dimensional schematic structural view of the receiving mechanism in an embodiment of the light bar assembling device according to the present disclosure.

Referring to FIGS. 1, 2, 9 and 10, in some embodiments, the receiving mechanism 20 includes: a second connecting seat 21, a second frame 22 and at least one second pick-and-place mechanism. The second connecting seat 21 is connected to the transferring mechanism 30. The second frame 22 is connected to the second connecting seat 21. At least one second pick-and-place mechanism which is arranged on the second frame 22, may obtain and release the light bar to be assembled. For example, the light bar located at the receiving position B is obtained, and the light bar is released to the support plate 42 of the adjusting platform 40 after being moved by the transferring mechanism 30 to the sky side of the adjusting platform 40.

Each second pick-and-place mechanism may implement obtaining, holding and releasing one light bar. When a plurality of light bars need to be operated at the same time, a plurality of second pick-and-place mechanisms may be provided on the second frame 22, such that the plurality of light bars may be obtained, held, and released respectively through the plurality of second pick-and-place mechanisms. For example, in FIG. 10, three second pick-and-place mechanisms are connected to a ground side of the second frame 22, which can implement synchronously obtaining, holding and releasing one to three light bars.

Referring to FIGS. 9 and 10, in some embodiments, each of the second pick-and-place mechanisms includes: at least two second suction cup groups. Each second suction cup group includes at least one second suction cup 23, and the second suction cups 23 in the at least two second suction cup groups are located in a same plane. The second suction cups 23 may realize the vacuum suction action and the release action after the vacuum is released under the switching of the solenoid valve. The at least two second suction cup groups suck the light bar at the at least two positions in a length direction, so that it is possible to more stably and reliably obtain and transfer the light bar by the second pick-and-place mechanism.

Referring to FIGS. 2 and 9, in some embodiments, the transferring mechanism 30 includes: a first upstand 31, a first slide rail module 32, a second slide rail module 33 and a third slide rail module 34. The first upstand 31 is located on an opposite side of the robot assembling mechanism 50. The first upstand 31 may be fixedly or detachably connected with the support frame 70. The first slide rail module 32 is arranged on one side of the first upstand 31 adjacent to the robot assembling mechanism 50, and has a first slide rail 321 extending along a first horizontal direction parallel to the horizontal plane and the first upstand 31 and a first slide block 322 slidable on the first slide rail 321. The first slide rail 321 may be fixedly arranged on a lateral surface of the first upstand 31, and its extension range may correspond to a range from the receiving position B to the adjusting platform. In other embodiments, the first slide rail 321 may also be arranged on the support frame 70 or independent to the support frame 70. The first slide rail 321 may also be not parallel to the horizontal plane so as to form a preset angle with the horizontal plane.

The second slide rail module 33 has a second slide rail 331 extending along a vertical direction and connected to the first slide 322 and a second slide block 332 slidable on the second slide rail 331. The third slide rail module 34 has a third slide rail 341 extending along a second horizontal direction and connected to the second slide block 332 and a third slide block 342 slidable on the third slide rail 341 and connected to the receiving mechanism 20, where the second horizontal direction is parallel to the horizontal plane and perpendicular to the first horizontal direction. In other embodiments, the second slide rail 331 may also be not arranged vertically to form a preset angle with the ground. The third slide rail 341 may also be not parallel to the horizontal plane but form a preset angle with the horizontal plane.

In FIG. 9, the first slide rail module 32, the second slide rail module 33 and the third slide rail module 34 respectively include drag chains 323, 333, and 334 for accommodating lines. The respective slide rails of the three slide rail modules are parallel to the three mutually orthogonal directions, so that the receiving mechanism 20 has a more free movement adjustment space, which satisfies the fine control requirements of obtaining the light bar at the receiving position B and releasing the light bar on the adjusting platform. The first slide rail module 32, the second slide rail module 33, and the third slide rail module 34 may all use the existing slide rail modules available on the market.

Referring to FIG. 10, in order to enable the receiving mechanism 20 to obtain three light bars at the same time, in some embodiments, at least two second suction cup groups include three second suction cup groups, and the receiving mechanism 20 further includes: two guide rails 241, four fourth slide blocks 251, two third guide rails 242, four second sliding seats 252, two guide rods 243, two second fixing seats 261, a third driving mechanism, two third fixing seats 262, a fourth driving mechanism and a fourth fixing seat 263.

In FIG. 10, the two second guide rails 241 are fixedly connected to the second frame 22. Every two of the four fourth slide blocks 251 are slidably connected to one of the two second guide rails 241. The two third guide rails 242 are perpendicular to the second guide rail 241, and each third guide rail 242 is respectively fixedly connected to two of the four fourth slide blocks 251. The four second sliding seats 252 are respectively connected to the four second suction cup groups, and every two of the second sliding seats 252 are slidably connected to one of the two third guide rails 242. The two guide rods 243 are parallel to the second guide rail 241, and each guide rod 243 is respectively slidably connected to two of the four second sliding seats 252.

The two second fixing seats 261 are respectively fixedly connected to the two third guide rails 242, and respectively connected to the two second suction cup groups. Each second fixing seat 261 is located between the two second sliding seats 252 on the third guide rail 242 connected to the second fixing seat 261. The third driving mechanism is connected to the two second fixing seats 261, and configured to drive the two second fixing seats 261 to move along an extending direction of the guide rod 243 so as to drive the two third guide rails 242 to move relative to the second frame 22. The two second fixing seats 261 are driven by the third driving mechanism, so that the second fixing seat 261 may drive the second suction cup group to perform position adjustment along an extending direction of the guide rod 243, which allows that position adjustment is performed on the second suction cup group according to a gap size of the plurality of lights at the receiving position B.

The two third fixing seats 262 are respectively fixedly connected to the two guide rods 243, and respectively connected to the two second suction cup groups. Each third fixing seat 262 is located between the two second sliding seats 252 on the guide rod 243 connected to the third fixing seat 262. The fourth driving mechanism is connected to the two third fixing seats 262, and configured to drive the two third fixing seats 262 to move along an extending direction of the third guide rail 242, so as to drive the two guide rods 243 to move relative to the second frame 22. The fourth driving mechanism drives the two third fixing seats 262, so that the third fixing seat 262 may drive the guide rod 243 together with the second sliding seat 252 to perform position adjustment along an extending direction of the third guide rail 242, which allows that a suction position of the second suction cup may be adjusted according to a length of the light bar so as to meet the suction requirements of light bars with different specifications.

One fourth fixing seat 263 is fixedly connected to the second frame 22 and one second suction cup group. The fourth fixing seat 263 is located between the two second fixing seats 261, and also located between the two third fixing seats 262. The second suction cup group connected to each second sliding seat 252 includes two second suction cups 23. The two second suction cups 23 connected to the second sliding seats 252 may allow a more stable process of sucking and holding the light bars.

Each of the second suction cup groups respectively connected to each second fixing seat 261, each third fixing seat 262 and the fourth fixing seat 263 includes a second suction cup 23. The second suction cup 23 may suck the middle of the light bar, so as to prevent sagging of the middle of the light bar from when moved.

Referring to FIG. 10, in some embodiments, the third driving mechanism includes: a third lead screw 271, a third power mechanism 273, and two third nuts 272. The third lead screw 271 which is arranged on the second frame 22, is rotatable around an axis of the third lead screw. The axis of the third lead screw is parallel to an extending direction of the second guide rail 241. The third power mechanism 273 is arranged on the second frame 22 and connected to the third lead screw 271 for outputting power to the third lead screw 271. The third power mechanism 273 may be a servo motor or a stepping motor and the like.

The two third nuts 272 are respectively fixedly connected to the two second fixing seats 261, and threadedly engaged with the third lead screw 271. The two third nuts 272 may move relative to the second frame 22 along an extending direction of the third lead screw 271 as the third lead screw 271 rotates, so as to drive the two second fixing seats 261 to move relative to the second frame 22. In FIG. 10, the third lead screw 271 may include: a coupling and two lead screw sections respectively connected to both ends of the coupling and having opposite threads. The two lead screw sections are threadedly engaged with the two third nuts 272 respectively. When the third lead screw 271 is driven to rotate by the third power mechanism 273, the two third nuts 272 may be driven to move close to each other or away from each other.

In FIG. 10, the fourth driving mechanism may include a fourth lead screw 281, a fourth power mechanism, and two fourth nuts 282. The fourth lead screw 281 which is arranged on the second frame 22, is rotatable around an axis of the fourth lead screw 281, and the axis of the fourth lead screw 281 is parallel to an extending direction of the third guide rail 242. The fourth power mechanism is arranged on the second frame 22 and connected to the fourth lead screw 281 for outputting power to the fourth lead screw 281. The fourth power mechanism may be a servo motor or a stepping motor and the like.

The two fourth nuts 282 are respectively fixedly connected to the two third fixing seats 262 and threadedly engaged with the fourth lead screw 281. The fourth nut 282 may move relative to the second frame 22 along an extending direction of the fourth lead screw 281 as the fourth lead screw 281 rotates, so as to drive the two third fixing seats 262 to move relative to the second frame 22.

The fourth lead screw 281 may refer to the structure of the third lead screw 271, and may include: a coupling 2811 and two lead screw sections respectively connected to both ends of the coupling 2811 and having opposite threads. The two lead screw sections are threadedly engaged with the two fourth nuts 282 respectively. When the fourth lead screw 281 is driven to rotate by the fourth power mechanism, the two fourth nuts 282 may be driven to move close to each other or away from each other.

Referring to the transferring mechanism and the receiving mechanism shown in FIGS. 9 and 10, the receiving mechanism 20 connected to the transferring mechanism may be adjusted in position along three mutually orthogonal directions, which may achieve movement of the light bar in a large range, and may also perform relatively fine position adjustment at the receiving position B and the sky side of the adjusting platform. The second suction cup group in the receiving mechanism may suck, hold and release the light bar, and a plurality of groups of guide rail and slide block cooperating structures in different directions in the receiving mechanism may realize the fine adjustment of a suction position of the light bar by the second suction cup group, thereby improving the accuracy of operation.

Figure 11:
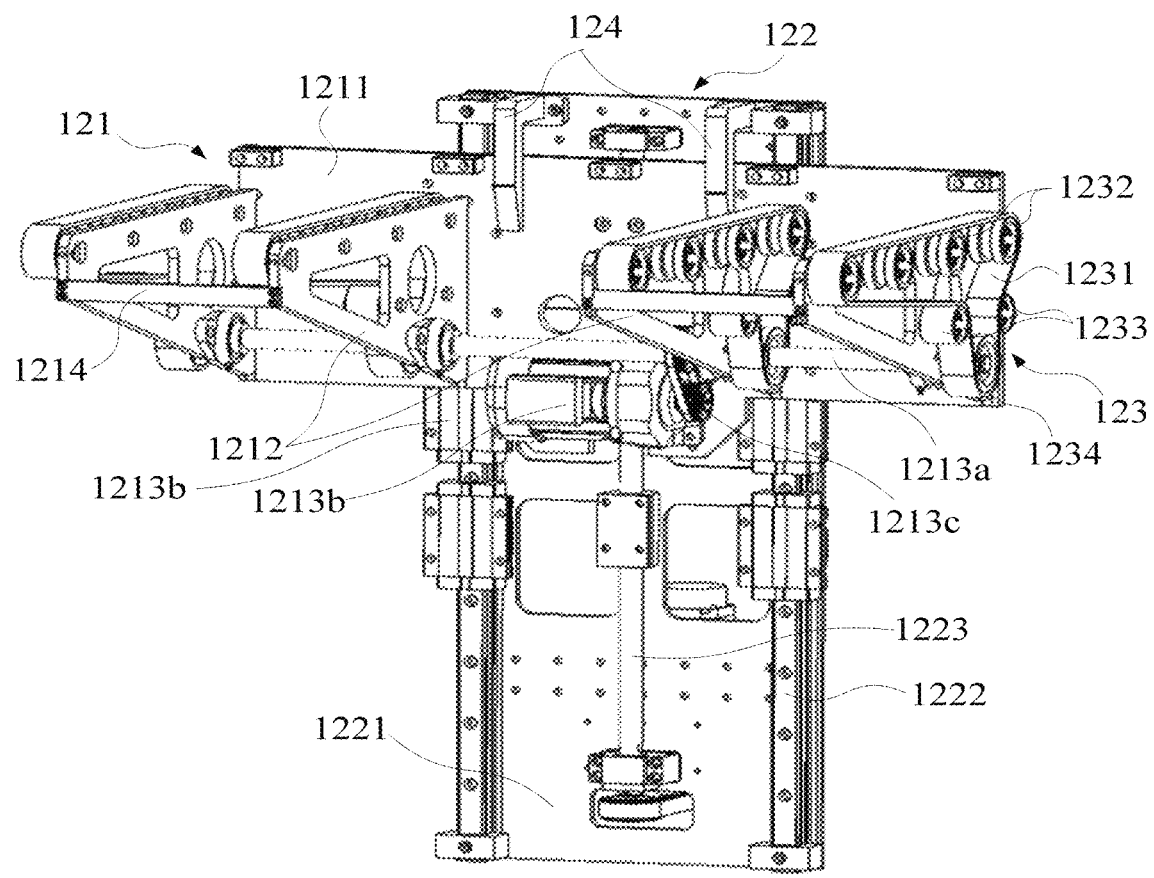
FIG. 11 is a schematic structural view of a hoist in an embodiment of the light bar assembling device according to the present disclosure.

FIG. 11 is a schematic structural view of a hoist in an embodiment of the light bar assembling device according to the present disclosure.

Referring to FIGS. 1, 2 and 11, in some embodiments, the feeding mechanism 10 includes: a first conveyor belt 11 and a hoist 12. The first conveyor belt 11 is arranged between the feeding position A and the receiving position B, for conveying a pallet carrying the light bars. The pallet launched on the first conveyor belt 11 may be a single pallet or a multi-layer pallet. Moreover, at least one layer of light bars may be carried in one pallet, and each layer of light bars may include at least one light bar.

The hoist 12 is arranged in the receiving position B in a liftable manner. The hoist 12 may perform a lifting operation, so that it may run to the same height as a conveying surface of the first conveyor belt 11. At this time, the hoist 12 is connected to or adjacent to the output end of the first conveyor belt 11. In this way, the pallet on the first conveyor belt 11 may be conveyed to the hoist 12 to implementing a pallet from the first conveyor belt 11 by the hoist 12. The hoist 12 may adjust a height position of the pallet received by the hoist 12.

In order to adjust the pallet to a position convenient for receiving by the hoist 12 during the process when the pallet is conveyed by the first conveyor belt 11, referring to FIG. 2, in some embodiments, the feeding mechanism 10 may further include a pallet position adjusting mechanism 13 for adjusting a position of the pallet moving along with the first conveyor belt 11, so that the pallet is accurately received by the hoist 12.

In FIG. 2, the pallet position adjusting mechanism 13 may specifically include: two lateral upstands 131 arranged oppositely and a seventh driving mechanism 132 connected to the two lateral upstands 131. The two lateral upstands 131 may both be parallel to the conveying direction of the first conveyor belt 11 and perpendicular to the conveying surface of the first conveyor belt 11. The two lateral upstands 131 may be entirely located on a sky side of the first conveyor belt 11 to avoid causing interference with the first conveyor belt 11. The seventh driving mechanism 132 which is connected to the two lateral upstands 131, may drive the two lateral upstands 131 to move close to each other or away from each other, so as to push a lateral profile of the pallet so that the position adjustment of the first conveyor belt 11 is completed along with the movement of the first conveyor belt 11.

The seventh driving mechanism 132 may be arranged on a sky side of the first conveyor belt 11. Its structure may refer to the lead screw and nut cooperating structure used by various driving mechanisms described previously. That is, the lead screw is driven to drive two nuts with opposite thread directions to rotate, thereby driving the two lateral upstands fixedly connected to the two nuts to move close to each other so as to realize the effect of pushing the lateral profile of the pallet.

Referring to FIG. 11, in some embodiments, the hoist 12 includes: a hoisting frame 121, a fifth driving mechanism 122 and at least one support belt assembly 123. The fifth driving mechanism 122 which is connected to the hoisting frame 121, may drive the hoisting frame 121 to move along a vertical direction. At least one support belt assembly 123 is arranged on the hoisting frame 121 to form a support surface capable of moving along a conveying direction of the first conveyor belt 11. In this way, the fifth driving mechanism 122 may drive the hoisting frame 121 to move along a vertical direction to a position that is the same height or substantially the same height as the conveying surface of the first conveyor belt 11, and the pallet on the first conveyor belt 11 is moved by the at least one support belt assembly 123 to the support surface of the support belt assembly 123 itself.

In some embodiments, the hoisting frame 121 may specifically include: a second upstand 1211, at least one third upstand 1212, and a sixth driving mechanism. The second upstand 1211 is perpendicular to a conveying direction of the first conveyor belt 11. At least one third upstand 1212 is fixedly connected to the second upstand 1211 and perpendicular to the second upstand 1211. The sixth driving mechanism 1213 which is connected to the at least one support belt component 123, may drive a support surface of the at least one support belt component 123 to move.

The second upstand 1211 may be driven by the fifth driving mechanism 122 to achieve movement in a vertical direction, and carries at least one third upstand 1212. The third upstand 1212 carries at least one support belt assembly 123, and the fifth driving mechanism 122 may be arranged on the second upstand 1211 or the third upstand 1212. The number of third upstands 1212 may be selected according to the size of the pallet and the size of the support belt assembly. In a width direction perpendicular to a conveying direction of the first conveyor belt, if the size of the pallet is smaller and the size of the support belt assembly is larger, less third upstands 1212 may be provided. For example, one or two third upstands 1212 may be provided. Otherwise, more third upstands 1212 may be provided, for example, four or six third upstands 1212 are provided.

In some embodiments, the respective support belt assemblies 12 are in one-to-one correspondence with the respective third upstands 1212. In other embodiments, two third upstands 1212 may also be configured to fix one support belt assembly. The adjacent third upstands 1212 may be connected therebetween by a connecting plate 1214. For example, the connecting plate 1214 restrains a cantilever portion of the third upstand 1212 relative to the second upstand 1211 so as to prevent that a separate third upstand 1212 is loosened at a connection position of the second upstand 1211. In FIG. 11, two of the four third upstands 1212 on a left side are connected by one connecting plate 1214, and two third upstands 1212 on a right side are connected by another connecting plate 1214.

In some embodiments, each support belt assembly 123 may include: an endless support belt 1231, a plurality of support wheels 1232, a plurality of guide wheels 1233, and a driving wheel 1234. The plurality of support wheels 1232, the plurality of guide wheels 1233 and the driving wheel 1234 are rotatably connected to their corresponding third upstands 1212 and located on the same side of the third upstands 1212. The axes of the plurality of support wheels 1232 are located in the same horizontal plane, and the driving wheel 1234 and the plurality of guide wheels 1233 are both located on a ground side of the plurality of support wheels 1232.

The endless support belt 1231 bypasses the plurality of support wheels 1232 on a sky side of the plurality of support wheels 1232, and bypasses the driving wheel 1234 and the plurality of guide wheels 1233. In this way, as the driving wheel 1234 rotates, the driving wheel 1234 may drive the endless support belt 1231 to move along a trajectory collectively defined by the plurality of support wheels 1232, the plurality of guide wheels 1233, and the driving wheel 1234, and implement a support surface that continuously moves to the second upstand 1211 on a sky side of the plurality of support wheels 1232. With such moving support surface, the pallet containing alight bar can be reliably transferred from the first conveyor belt 11 to the hoist 12, and can also be stably supported by the hoist 12.

Referring to FIG. 11, in some embodiments, the hoist 12 may further include at least one blocking member 124. The at least one blocking member 124 may be arranged on the fifth driving mechanism 122 or the hoisting frame 121, to limit a movement position of the pallet on the support belt assembly 123. The blocking surface of the blocking member 124 may be arranged perpendicular to a movement direction of the support belt assembly 123. In order not to change an angle of the pallet when the pallet is blocked, it is optional to provide at least two blocking members 124 to block the pallet.

For the embodiment in which the blocking member 124 is arranged on the fifth driving mechanism 122, the blocking member 124 may be arranged in an L shape, with one end connected to the fifth driving mechanism 122, and the other end extending toward a ground side along a vertical direction. When the hoist 12 moves to a height of the blocking member 124, the blocking member 124 may finely adjust a movement position of the pallet on the support belt assembly 123. For the embodiment in which the blocking member 124 is arranged on the hoisting frame 121, the blocking member 124 may move synchronously along with the hoisting frame 121, thereby always forming a restricting effect on a position of the pallet.

In FIGS. 2 and 11, the fifth driving mechanism 122 specifically includes: a fourth upstand 1221, a fourth guide rail 1222, a fifth lead screw 1223, a fifth power mechanism 1224, a fifth nut, and a third sliding seat 1225. The fourth upstand 1221 is perpendicular to a conveying direction of the first conveyor belt 11, and the fourth upstand 1221 may be fixedly connected to the support frame 70 and adjacent to the receiving position B.

The fourth guide rail 1222 is arranged on one side of the fourth upstand 1221 adjacent to the first conveyor belt 11, and extends in a direction parallel to the vertical direction. The fifth lead screw 1223 is parallel to the fourth guide rail 1222, and the fifth power mechanism 1224 is arranged on the fourth upstand 1221 and connected to the fifth lead screw 1223, for outputting power to the fifth lead screw 1223.

The fifth nut is fixedly connected to the hoisting frame 121, and threadedly engaged with the fifth lead screw 1223. As the fifth lead screw 1223 rotates, the fifth nut may move relative to the fourth upstand 1221 along an extending direction of the fifth lead screw 1223, so as to drive the hoisting frame 121 to perform a lifting and lowering movement. The third sliding seat 1225 is fixedly connected to the hoisting frame 121, and slidably connected to the fourth guide rail 1222.

In FIG. 11, the sixth driving mechanism includes a rotary shaft 1213*a* and a sixth power mechanism 1213*b*. The rotary shaft 1213*a* is fixedly connected to the driving wheel 1234 in each support belt assembly 123. The sixth power mechanism 1213*b* is arranged on the second upstand 1211 or the third upstand 1212, and connected to the rotary shaft 1213*a* through a belt transmission mechanism 1213*c*, and configured to output power to the rotary shaft 1213*a*, so that the rotary shaft 1213*a* rotates and drives the driving wheel 1234 to rotate synchronously. The sixth power mechanism 1213*b* may be a servo motor or a stepping motor. The rotary shaft 1213*a* may drive all the driving wheel 1234 to rotate synchronously, thereby driving the support surfaces provided by all the support belt assemblies 123 to have the same movement rate, and ensuring the stability of the pallet on the support surface.

Figure 12:
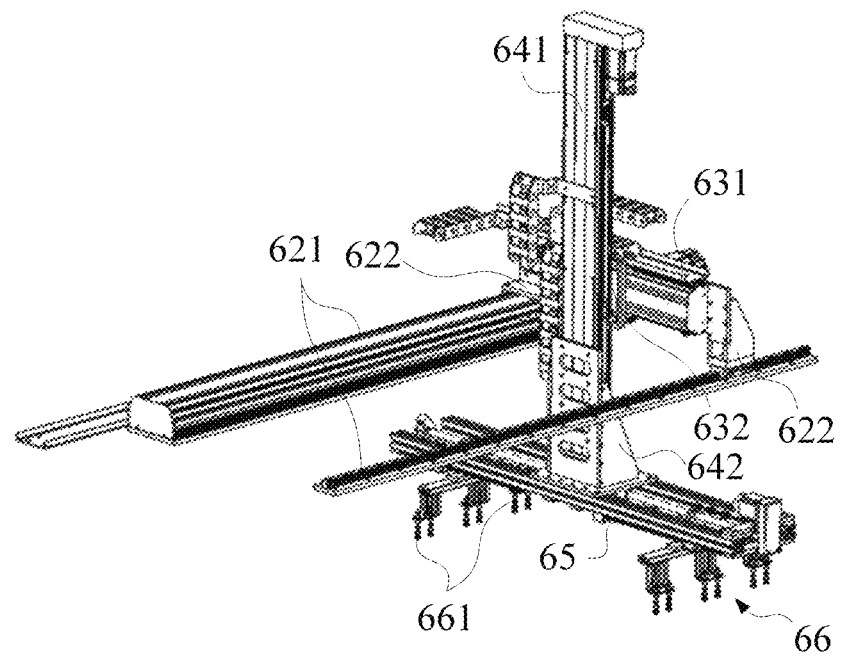
FIG. 12 is a schematic view of a mounting structure of the removing mechanism in an embodiment of the light bar assembling device according to the present disclosure.

FIG. 12 is a schematic view of a mounting structure of the removing mechanism in an embodiment of the light bar assembling device according to the present disclosure.

Referring to FIGS. 1, 2, and 12, the removing mechanism 60 may be configured to remove an empty pallet that is located at the receiving position B and emptied, so as to avoid that the empty pallet occupies the space for subsequent feeding of the light bars, thereby improving the continuity of the process. In addition, the removing mechanism 60 may also be configured to remove a defective product determined in the light bars to be assembled at the receiving position B.

In FIG. 12, the removing mechanism 60 may include: at least one second conveyor belt 61, a fourth slide rail module 62, a fifth slide rail module 63, a sixth slide rail module 64, a third frame 65, and at least one third pick-and-place mechanism 66. At least one second conveyor belt 61 is optionally located on a sky side of the first conveyor belt 11, so as not to cause interfere with a feeding process of the first conveyor belt 11. In some embodiments, the conveying direction of the second conveyor belt 61 is opposite to the conveying direction of the first conveyor belt 11, so that it may convey the empty pallet or the defective product back to the side of the feeding position A. In other embodiments, the direction of the second conveyor belt 61 may also be perpendicular to or present an acute or obtuse angle with the conveying direction of the first conveyor belt 11. In addition, the removing mechanism 60 in FIG. 12 includes two second conveyor belts 61, one for conveying the defective product and the other for conveying the empty pallet.

The fourth slide rail module 62 is arranged on a sky side of the second conveyor belt 61, and has a fourth slide rail 621 extending in a third horizontal direction parallel to the horizontal plane and the conveying direction of the second conveyor belt 61 and a fourth slide block 622 slidable on the fourth slide rail 621. The fourth slide rail 621 of the fourth slide rail module 62 may be arranged on the support frame 70. The fifth slide rail module 63 has a fifth slide rail 631 connected to the fourth slide 622 and a fifth slide 632 slidable on the fifth slide rail 631. The fifth slide rail 631 extends along a fourth horizontal direction parallel to the horizontal plane and perpendicular to the conveying direction of the second conveyor belt 61.

The sixth slide rail module 64 has a sixth slide rail 641 extending along a vertical direction and connected to the fifth slide 632 and a sixth slide 642 slidable on the sixth slide 641. The third frame 65 is fixedly connected to the sixth slide block 642, and at least one third pick-and-place mechanism 66 is arranged on the third frame 65 and configured to obtain at least one of the empty pallet and the defective product and release the same on the second conveyor belt 61.

In FIG. 12, the third pick-and-place mechanism 66 includes: at least two third suction cup groups. Each third suction cup group includes at least one third suction cup 661, and the third suction cups 661 in the at least two third suction cup groups are located in the same plane. The third suction cup 661 may realize the vacuum suction action and the release action after the vacuum is released under the switching of the solenoid valve. In the third pick-and-place mechanism 66, the structure of adjusting a suction position of the third suction cup group may be adjusted by referring to the structural configurations of the first pick-and-place mechanism and the second pick-and-place mechanism. In some embodiments, considering that the empty pallet may be sucked in a large area, the adjustment of the sucking position of the third slide rail module can be omitted, and it is enough for position adjustment depending on the driving of the fourth slide rail module and the fifth slide rail module.

With reference to various embodiments of the light bar assembling device described previously, the present disclosure also provides embodiments of a corresponding assembling method.

Figure 13:
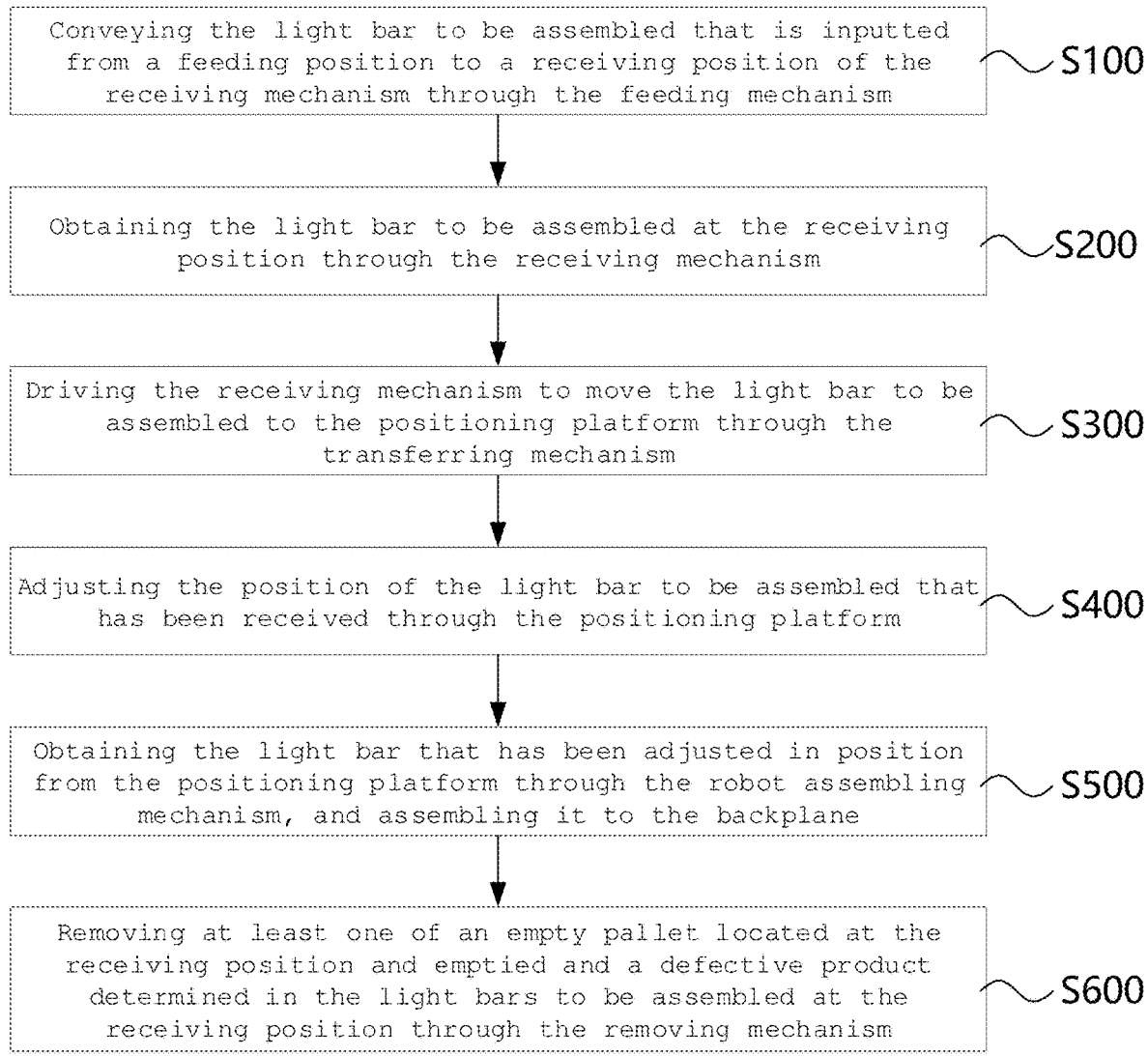
FIG. 13 is a schematic flowchart of an embodiment of the assembling method according to the present disclosure.

FIG. 13 is a schematic flowchart of an embodiment of an assembling method according to the present disclosure.

Referring to FIG. 13, in some embodiments, the assembling method includes step S200 to step S500. In step S200, the light bar to be assembled at the receiving position B is obtained by the receiving mechanism. In step S300, the receiving mechanism is driven by the transferring mechanism to move the light bar to be assembled to the adjusting platform. In step S400, the position of the light bar to be assembled that has been received is adjusted by the adjusting platform. In step S500, the light bar after being adjusted in position is obtained from the adjusting platform by the robot assembling mechanism, and assembled with the backplane.

In step S500, the light bar after being adjusted in position on the adjusting platform may be positioned by the at least two first positioning pins in the end effector of the robot assembling mechanism. Moreover, the light bar after being adjusted in position is sucked by at least two first suction cup groups of the end effector, and then the end effector is moved by the mechanical arm of the robot assembling mechanism and releases the light bar after being adjusted in position to the backplane for assembling with the same.

Referring to FIGS. 1 and 2, before step S200, step S100 may be further included. That is, the light bar to be assembled that is inputted from the feeding position A is conveyed to the receiving position B of the receiving mechanism through the feeding mechanism. In other embodiments, the assembling method may further include step S600. That is, at least one of an empty pallet located at the receiving position B and emptied and a defective product determined in the light bars to be assembled at the receiving position B is removed by the removing mechanism. Step S600 may be performed before, after, or simultaneously with any of the steps S100 to S500.

Multiple embodiments in the present description are described in a progressive manner, with different focuses for the respective embodiments which may be subjected to cross-reference for the same or similar portions. For the embodiments of the assembling method, since the method as a whole and the steps involved are in a relationship corresponding to the content in the embodiments of the assembling device, such embodiments are described in a relatively simple manner. The partial descriptions of the embodiments of the system may be referred thereto for the relevant aspects.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features may be made without departing from the scope and spirit of the present disclosure. The scope of the present disclosure is defined by the appended claims.

What is claimed is:

1. A light bar assembling device for assembling a light bar with a backplane, comprising:
   an adjusting platform configured to carry the light bar to be assembled and adjust a position of the light bar to be assembled on the adjusting platform; and
   a robot assembling mechanism configured to obtain the light bar after being adjusted from the adjusting platform, and assemble the light bar with the backplane,
   wherein the robot assembling mechanism comprises a mechanical arm and an end effector arranged at a free end of the mechanical arm, the end effector comprising:
   a first connecting seat connected with the free end of the mechanical arm;
   a first frame connected to the first connecting seat;
   at least one first pick-and-place mechanism arranged on the first frame and configured to obtain the light bar after being adjusted from the adjusting platform and place the light bar on the backplane, wherein the at least one first pick-and-place mechanism is one first pick-and-place mechanism or multiple first pick-and-place mechanisms, the one first pick-and-place mechanism or each of the multiple first pick-and-place mechanisms comprises at least two first suction cup groups, each of which comprises at least one first suction cup, and first suction cups in the at least two first suction cup groups are located in a same plane; and
   at least one first positioning mechanism arranged on the first frame and configured to be insertedly mated with a positioning hole in the light bar after being adjusted, wherein the at least one first positioning mechanism is one first positioning mechanism or multiple first positioning mechanisms, the one first positioning mechanism or each of the multiple first positioning mechanisms comprises at least two first positioning pins located in a same plane as the first suction cups in the at least two first suction cup groups.

2. The light bar assembling device according to claim 1, wherein the at least two first suction cup groups comprise three first suction cup groups, and the end effector further comprises:
   two first sliding seats connected to the first frame;
   a first fixing seat fixedly connected to the first frame and located between the two first sliding seats;
   a first driving mechanism connected to the two first sliding seats, and configured to drive the two first sliding seats to move relative to the first frame;

three groups of first cylinders respectively connected to the first fixing seat and the two first sliding seats, wherein each group of first cylinders comprises at least one first cylinder; and three groups of first connection racks respectively connected to power output ends of the three groups of first cylinders, and respectively connected to the three first suction cup groups, wherein each of the three groups of first connection racks comprises at least one first connection rack, wherein the at least two first positioning pins comprise two first positioning pins respectively connected to first connection racks corresponding to the two first sliding seats.

3. The light bar assembling device according to claim 2, wherein the first driving mechanism comprises:

a first lead screw arranged on the first frame and rotatable around an axis of the first lead screw, wherein the axis of the first lead screw is parallel to a length direction of the light bar after being adjusted, and the first lead screw comprises two lead screw sections with opposite threads and a coupling with both ends connected to the two lead screw sections respectively;

a first power mechanism arranged on the first frame, connected to the first lead screw, and configured to output power to the first lead screw; and two first nuts respectively fixedly connected to the two first sliding seats, and threadedly engaged with the two lead screw sections of the first lead screw respectively, and configured to move relative to the first frame along an extending direction of the first lead screw as the first lead screw rotates, so as to drive the two first sliding seats to move relative to the first frame.

4. The light bar assembling device according to claim 2, wherein each of the at least one first connection rack comprises:

a C-shaped bending plate comprising a connecting portion, and a first bent portion and a second bent portion respectively connected to both ends of the connecting portion, wherein the first bent portion and the second bent portion are parallel to each other and perpendicular to the connecting portion, and the first bent portion and the second bent portion are respectively connected to a power output end of the first cylinder and a corresponding first suction cup group.

5. The light bar assembling device according to claim 2, wherein the robot assembling mechanism further comprises:

an image sensor arranged on the first frame, and configured to perform image collection on the light bar to be assembled that is located on the adjusting platform and the backplane;

a mounting bracket fixedly connected to the first fixing seat and provided with a threaded hole; and an adjusting bracket connected to the mounting bracket and the image sensor, and adjustable relative to the mounting bracket, wherein the adjusting bracket comprises:

a mounting board having a through hole, wherein the through hole receives the image sensor; and an adjusting plate comprising an adjusting groove having a length direction perpendicular to the mounting plate, wherein the threaded hole is alignable with a plurality of positions of the adjusting groove in a length direction, so that a screw member passes through the adjusting groove and is threadedly connected to the threaded hole, and the adjusting plate is fixedly connected to or integrally formed with the mounting plate, and adjustable in position relative to the mounting bracket.

6. The light bar assembling device according to claim 1, wherein the adjusting platform comprises:

a base;

a support plate located on a sky side of the base and configured to support the light bar to be assembled, wherein the support plate is provided with at least one through hole group, the at least one through hole group is one through hole group or multiple through hole groups, and the one through hole group or each of the multiple through hole groups comprises at least two through holes penetrating along a vertical direction of the support plate;

a support pin located between the support plate and the base, configured to support the support plate, and form a receiving space between the support plate and the base; and at least one centering adjustment mechanism arranged on the base, wherein at least a portion of at least one centering adjustment mechanism is located in the receiving space, and configured to centrally position the light bar to be assembled on the support plate, wherein at least one centering adjustment mechanism is one centering adjustment mechanism or multiple centering adjustment mechanisms, and the one centering adjustment mechanism or each of the multiple centering adjustment mechanisms comprises:

at least two second cylinders, each of the at least two second cylinders having two power output ends which are movable close to each other or away from each other, wherein the two power output ends are fixedly connected to two clamping claws respectively, wherein the two clamping claws are exposed from an upper surface of the support plate via the through holes, and configured to be driven by the second cylinder to centrally position the light bar located between the two clamping claws in a width direction of the light bar.

7. The light bar assembling device according to claim 6, wherein the support plate is provided with at least one groove group, the at least one groove group is one groove group or multiple groove groups, the one groove group or each of the multiple groove groups comprises two grooves located on a same straight line and penetrating along a vertical direction of the support plate, wherein the at least one centering adjustment mechanism comprises a plurality of centering adjustment mechanisms, and each of the plurality of centering adjustment mechanisms comprises:

two second positioning pins exposable or retractable from an upper surface of the support plate via two grooves of the support plate along a vertical direction of the support plate respectively;

two third cylinders connected to the two second positioning pins, and configured to drive the two second positioning pins to move along a vertical direction of the support plate, wherein a cylinder block of a third cylinder is fixedly connected to a guide sleeve having a through inner cavity, such that a second positioning pin passes through the through inner cavity of the guide sleeve, and is fixedly connected to a power output end of the third cylinder; and a second driving mechanism connected to the two third cylinders, and configured to drive the two third cylinders to move close to each other or away from each other along a straight line where the two grooves are located, wherein the second driving mechanism is shared by the plurality of centering adjustment mechanisms.

8. The light bar assembling device according to claim 7, wherein the base is provided with a first guide rail extending in a direction parallel to a length direction of a light bar having been positioned in a width direction, and the second driving mechanism comprises:
two second sliding seats slidably connected to the first guide rail, and respectively connected to two third cylinders of each of the plurality of centering adjustment mechanisms;
a second lead screw arranged on the support plate and rotatable around an axis of the second lead screw, wherein the second lead screw comprises two lead screw sections with opposite threads and a coupling with both ends connected to the two lead screw sections respectively;
a second power mechanism arranged on the base, connected to the second lead screw, and configured to output power to the second lead screw; and
two second nuts respectively fixedly connected to the two second sliding seats and respectively threadedly engaged with the two lead screw sections, and configured to move relative to the first guide rail along an extending direction of an axis of the second lead screw as the second lead screw rotates, so as to drive the two second sliding seats to move relative to the support plate.

9. The light bar assembling device according to claim 1, further comprising:
a receiving mechanism configured to obtain the light bar to be assembled; and
a transferring mechanism connected to the receiving mechanism and configured to drive the receiving mechanism to move the light bar to be assembled to the adjusting platform.

10. The light bar assembling device according to claim 9, wherein the receiving mechanism comprises:
a second connecting seat connected to the transferring mechanism;
a second frame connected to the second connecting seat;
at least one second pick-and-place mechanism arranged on the second frame and configured to obtain and release the light bar to be assembled, wherein the at least one second pick-and-place mechanism is one second pick-and-place mechanism or multiple second pick-and-place mechanisms, the one second pick-and-place mechanism or each of the multiple second pick-and-place mechanisms comprises at least two second suction cup groups, each of the at least two second suction cup groups comprises at least one second suction cup, and second suction cups in the at least two second suction cup groups are located in a same plane;
two second guide rails fixedly connected to the second frame;
four first slide blocks, every two of which are slidably connected to one of the two second guide rails;
two third guide rails perpendicular to the second guide rails, wherein respective third guide rails are respectively fixedly connected to two of the four first slide blocks;
four second sliding seats respectively connected to four second suction cup groups, wherein every two second sliding seats are slidably connected to one of the two third guide rails;
two guide rods parallel to the second guide rails, wherein each of the two guide rods are slidably connected to two of the four second sliding seats;
two second fixing seats respectively fixedly connected to the two third guide rails and respectively connected to the two second suction cup groups, wherein each of the two second fixing seats are located between two second sliding seats on a third guide rail connected to the second fixing seat;
a third driving mechanism connected to the two second fixing seats and configured to drive the two second fixing seats to move along an extending direction of the guide rod, so as to drive the two third guide rails to move relative to the second frame;
two third fixing seats respectively fixedly connected to the two guide rods and respectively connected to the two second suction cup groups, wherein each of the two third fixing seats are located between two second sliding seats on a guide rod connected to the third fixing seat;
a fourth driving mechanism connected to the two third fixing seats, and configured to drive the two third fixing seats to move along an extending direction of the third guide rails, so as to drive the two guide rods move relative to the second frame; and
one fourth fixing seat fixedly connected to the second frame and one second suction cup group, and located between the two second fixing seats and between the two third fixing seats.

11. The light bar assembling device according to claim 10, wherein:
the second suction cup group connected to each second sliding seat comprises two second suction cups, and the second suction cup group respectively connected to each second fixing seat, each third fixing seat and the fourth fixing seat comprises one second suction cup;
the third driving mechanism comprises:
a third lead screw arranged on the second frame, and rotatable around an axis of the third lead screw, wherein the axis of the third lead screw is parallel to an extending direction of the second guide rails;
a third power mechanism arranged on the second frame, connected to the third lead screw, and configured to output power to the third lead screw; and
two third nuts respectively fixedly connected to the two second fixing seats, threadedly engaged with the third lead screw, and configured to move relative to the second frame along an extending direction of the third lead screw as the third lead screw rotates, so as to drive the two second fixing seats to move relative to the second frame; and
the fourth driving mechanism comprises:
a fourth lead screw arranged on the second frame, and rotatable around an axis of the fourth lead screw, wherein the axis of the fourth lead screw is parallel to an extending direction of the third guide rail;
a fourth power mechanism arranged on the second frame, connected to the fourth lead screw, and configured to output power to the fourth lead screw; and
two fourth nuts respectively fixedly connected to the two third fixing seats, threadedly engaged with the fourth lead screw, and configured to move relative to the second frame along an extension direction of the fourth lead screw as the fourth lead screw rotates, so as to drive the two third fixing seats to move relative to the second frame.

12. The light bar assembling device according to claim 9, wherein the transferring mechanism comprises:
- a first upstand located on an opposite side of the robot assembling mechanism;
- a first slide rail module arranged on one side of the first upstand adjacent to the robot assembling mechanism, and having a first slide rail extending along a first horizontal direction parallel to a horizontal plane and the first upstand, and a first slide block slidable on the first slide rail;
- a second slide rail module having a second slide rail extending along a vertical direction and connected to the first slide block, and a second slide block slidable on the second slide rail; and
- a third slide rail module having a third slide rail extending along a second horizontal direction and connected to the second slide block, and a third slide block slidable on the third slide rail and connected to the receiving mechanism, where the second horizontal direction is parallel to the horizontal plane and perpendicular to the first horizontal direction.

13. The light bar assembling device according to claim 9, further comprising:
- a feeding mechanism configured to transfer the light bar to be assembled that is inputted from a feeding position, to a receiving position of the receiving mechanism, wherein the feeding mechanism comprises:
- a first conveyor belt arranged between the feeding position and the receiving position, and configured to convey a pallet carrying the light bar; and
- a hoist liftably arranged in the receiving position and configured to adjust a height position of a pallet received from the first conveyor belt, wherein the hoist running to the same height as a conveying surface of the first conveyor belt is connected to or adjacent to an output end of the first conveyor belt.

14. The light bar assembling device according to claim 13, wherein the hoist comprises:
- a hoisting frame;
- a fifth driving mechanism connected to the hoisting frame and configured to drive the hoisting frame to move along a vertical direction; and
- at least one support belt assembly arranged on the hoisting frame and configured to form a support surface movable along a conveying direction of the first conveyor belt;
- wherein the fifth driving mechanism comprises:
- a fourth upstand perpendicular to the conveying direction of the first conveyor belt;
- a fourth guide rail arranged on one side of the fourth upstand adjacent to the first conveyor belt, and extending in a direction parallel to a vertical direction;
- a fifth lead screw parallel to the fourth guide rail;
- a fifth power mechanism arranged on the fourth upstand, connected to the fifth lead screw, and configured to output power to the fifth lead screw;
- a fifth nut fixedly connected to the hoisting frame, threadedly engaged with the fifth lead screw, and configured to move relative to the fourth upstand along an extension direction of the fifth lead screw as the fifth lead screw rotates, so as to drive the hoisting frame to perform a lifting and lowering movement; and
- a third sliding seat fixedly connected to the hoisting frame and slidably connected to the fourth guide rail;
- wherein the hoisting frame comprises:
- a second upstand perpendicular to a conveying direction of the first conveyor belt;
- at least one third upstand fixedly connected to the second upstand and perpendicular to the second upstand; and
- a sixth driving mechanism connected to the at least one support belt assembly, and configured to drive a support surface of the at least one support belt assembly to move;
- wherein the at least one support belt assembly is in a one-to-one correspondence to at least one third upstand, and the at least one support belt assembly is one support belt assembly or multiple support belt assemblies, the one support belt assembly or each of the multiple support belt assemblies comprises: an endless support belt, a plurality of support wheels, a plurality of guide wheels and a driving wheel, wherein the plurality of support wheels, the plurality of guide wheels and the drive wheel are rotatably connected to a corresponding third upstand, and located on the same side of the third upstand, axes of the plurality of support wheels are located in the same horizontal plane, the driving wheel and the plurality of guide wheels are located on a ground side of the plurality of support wheels, and the endless support belt bypasses the plurality of support wheels on a sky side of the plurality of support wheels, and bypasses the driving wheel and the plurality of guide wheels;
- the sixth driving mechanism comprising:
- a rotary shaft fixedly connected to a driving wheel in each of the at least one support belt assembly; and
- a sixth power mechanism arranged on the second upstand or the third upstand, connected to the rotary shaft, and configured to output power to the rotary shaft, so as to cause the rotary shaft to rotate and drive the driving wheel to rotate synchronously.

15. The light bar assembling device according to claim 13, wherein the feeding mechanism further comprises:
- a pallet position adjusting mechanism configured to perform position adjustment on a pallet moving along with the first conveyor belt, so that the pallet is accurately received by the hoist; wherein the pallet position adjusting mechanism comprises:
- two lateral upstands oppositely arranged, which are both parallel to a conveying direction of the first conveyor belt and perpendicular to a conveying surface of the first conveyor belt; and
- a seventh driving mechanism connected to the two lateral upstands, and configured to drive the two lateral upstands to move close to each other or away from each other, to push a lateral profile of the pallet so that position adjustment of the pallet is completed along with movement of the first conveyor belt.

16. The light bar assembling device according to claim 13, further comprising:
- a removing mechanism configured to remove at least one of an empty pallet located at the receiving position and emptied, and a defective product determined in the light bars to be assembled at the receiving position;
- wherein the removing mechanism comprises:
- at least one second conveyor belt located on a sky side of the first conveyor belt, and having a conveying direction opposite to a conveying direction of the first conveyor belt;
- a fourth slide rail module arranged on a sky side of the at least one second conveyor belt, and having a fourth slide rail extending along a third horizontal direction parallel to a horizontal plane and a conveying direction of the at least one second conveyor belt, and a fourth slide block slidable on the four slide rail;

a fifth slide rail module having a fifth slide rail connected to the fourth slide block and extending along a fourth horizontal direction parallel to a horizontal plane and perpendicular to a conveying direction of the at least one second conveyor belt, and a fifth slide block slidable on the fifth slide rail;

a sixth slide rail module having a sixth slide rail extending along a vertical direction and connected to the fifth slide rail, and a sixth slide block slidable on the sixth slide rail;

a third frame fixedly connected to the sixth slide block; and at least one third pick-and-place mechanism arranged on the third frame and configured to obtain at least one of the empty pallet and the defective product and release the same to the at least one second conveyor belt, wherein the third pick-and-place mechanism comprises at least two third suction cup groups, each of the at least two third suction cup groups comprises at least one third suction cup, and third suction cups in the at least two third suction cup groups are located in a same plane.

17. An end effector, comprising:

a first connecting seat;

a first frame connected to the first connecting seat; and at least one first pick-and-place mechanism arranged on the first frame and configured to obtain and release a light bar, wherein the at least one first pick-and-place mechanism is one first pick-and-place mechanism or multiple first pick-and-place mechanisms, the one first pick-and-place mechanism or each of the multiple first pick-and-place mechanisms comprises: at least two first suction cup groups; and at least one first positioning mechanism arranged on the first frame, and configured to be insertedly mated with a positioning hole in the light bar;

wherein each of the at least two first suction cup groups comprises at least one first suction cup, and first suction cups in the at least two first suction cup groups are located in a same plane, and the at least one first positioning mechanism is one first positioning mechanism or multiple first positioning mechanisms, the one first positioning mechanism or each of the multiple first positioning mechanisms comprises at least two first positioning pins located in a same plane as the first suction cups in the at least two first suction cup groups.

* * * * *